US011275374B2

(12) United States Patent
Levinson

(10) Patent No.: US 11,275,374 B2
(45) Date of Patent: Mar. 15, 2022

(54) EVENT-BASED DATA LOGGING

(71) Applicant: Zoox, Inc., Foster City, CA (US)

(72) Inventor: Jesse Sol Levinson, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 212 days.

(21) Appl. No.: 16/224,385

(22) Filed: Dec. 18, 2018

(65) Prior Publication Data
US 2020/0192366 A1    Jun. 18, 2020

(51) Int. Cl.
| | |
|---|---|
| G05D 1/00 | (2006.01) |
| G06F 9/54 | (2006.01) |
| B60W 30/09 | (2012.01) |
| B60W 30/085 | (2012.01) |
| B60W 30/095 | (2012.01) |
| G01S 17/04 | (2020.01) |
| G01S 17/86 | (2020.01) |

(52) U.S. Cl.
CPC ......... *G05D 1/0088* (2013.01); *B60W 30/085* (2013.01); *B60W 30/09* (2013.01); *B60W 30/0956* (2013.01); *G01S 17/04* (2020.01); *G01S 17/86* (2020.01); *G06F 9/542* (2013.01)

(58) Field of Classification Search
CPC .................................................. G05D 1/0088
See application file for complete search history.

(56) References Cited

U.S. PATENT DOCUMENTS

| | | | |
|---|---|---|---|
| 9,555,740 B1* | 1/2017 | Zhu ........................ | G01D 18/00 |
| 10,062,281 B1* | 8/2018 | Brookins ........... | G01C 21/3492 |
| 10,909,782 B1* | 2/2021 | Natanzon ............. | G07C 5/0841 |
| 2015/0266488 A1 | 9/2015 | Solyom et al. | |
| 2019/0039545 A1* | 2/2019 | Kumar .................... | H04L 67/18 |
| 2020/0065711 A1* | 2/2020 | Clement .............. | G06N 3/0454 |

FOREIGN PATENT DOCUMENTS

| | | |
|---|---|---|
| RU | 2012126039 A | 12/2013 |
| WO | WO2018156451 A1 | 8/2018 |

OTHER PUBLICATIONS

De Jesus, "AI for Physical Securty—4 Current Applications," Sep. 11, 2018,Techemergence, retrieved at <<https://www.techemergence.com/ai-for-physical-security/>> 14 pages.
(Continued)

*Primary Examiner* — Imran K Mustafa
(74) *Attorney, Agent, or Firm* — Lee & Hayes, P.C.

(57) ABSTRACT

Techniques and methods for storing data. For instance, a vehicle can receive sensor data generated by one or more sensors. The vehicle can then detect that an event is occurring and/or has occurred using the sensor data. Based on detecting the event, the vehicle can flag a first portion of the sensor data as corresponding to the event. The vehicle can then store the first portion of the sensor data according to a first storage rule and a second portion of the sensor data according to a second storage rule. In some instances, the storage rules may indicate when sensor data is to be overwritten, lengths of time that the sensor data is to be stored, formats for storing the sensor data, and/or when the sensor data is to be sent to one or more computing devices.

20 Claims, 7 Drawing Sheets

(56) References Cited

OTHER PUBLICATIONS

Fabio, "Bring Deep Learning Algorithms to Your Security Cameras," Mar. 21, 2018, retrieved at <<https://hackaday.com/2018/03/21/bring-deep-learning-algorithms-to-your-security-cameras/>> 8 pages.

Raj, "How to Automate Surveillance Easily with Deep Learning," retrieved on Oct. 17, 2018 at <<htttps://medium.com/nanonets/how-to-automate-surveillance-easily-with-deep-learning-4eb4fa0cd68d>> 18 pages.

Rostra Accessories, "Dual-Channel HD DashCam Event Recording System", retrieved on Oct. 11, 2018 at <<http://www.rostra.com/dual-camera-dashboard-event-recording-system.php>>, 5 pages.

Vincent, "This Japanese AI security camera shows the future of surveillance will be automated," Jun. 26, 2018, retrieved from <<https://www.theverge.com/2018/6/26/17479068/ai-guardman-security-camera-shoplifter-japan-automated-surveillance>> 4 pages.

The PCT Search Report and Written Opinion dated Mar. 19, 2020 for PCT Application No. PCT/US2019/066987, 9 pages.

* cited by examiner

FIG. 2B

| Sensor Data 104 | Memory 112 | | | | | | |
|---|---|---|---|---|---|---|---|
| ~~204(1)~~ 204(10) | 204(2) | 204(3) | 204(4) | ~~204(5)~~ 204(11) | 204(6) | 204(7) | 204(8) | ~~204(9)~~ 204(12) | — Type 204
| ~~206(1)~~ 206(10) | 206(2) | 206(3) | 206(4) | ~~206(5)~~ 206(11) | 206(6) | 206(7) | 206(8) | ~~206(9)~~ 206(12) | — Type 206
| ~~208(1)~~ 208(10) | 208(2) | 208(3) | 208(4) | ~~208(5)~~ 208(11) | ~~208(6)~~ 208(12) | ~~208(7)~~ 208(13) | ~~208(8)~~ 208(14) | ~~208(9)~~ 208(15) | — Type 208
| ~~210(1)~~ 210(10) | 210(2) | 210(3) | 210(4) | ~~210(5)~~ 210(11) | ~~210(6)~~ 210(12) | ~~210(7)~~ 210(13) | ~~210(8)~~ 210(14) | ~~210(9)~~ 210(15) | — Type 210

EVENT-BASED DATA LOGGING

BACKGROUND

Vehicles may generate large amounts of data during operation. For instance, an autonomous vehicle operating in an environment may capture sensor data generated by one or more sensors located on the autonomous vehicle. The autonomous vehicle may use the sensor data to navigate through the environment. Additionally, the autonomous vehicle may store the sensor data in memory. Storing such large amounts of sensor data can require significant storage capacity which can be computationally and financially costly. Moreover, offloading or transferring such large amounts of sensor data is time consuming and results in significant network traffic.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2B is an example of overwriting data stored in a memory according to storage rules, in accordance with embodiments of the disclosure.

DETAILED DESCRIPTION

Figure 1:
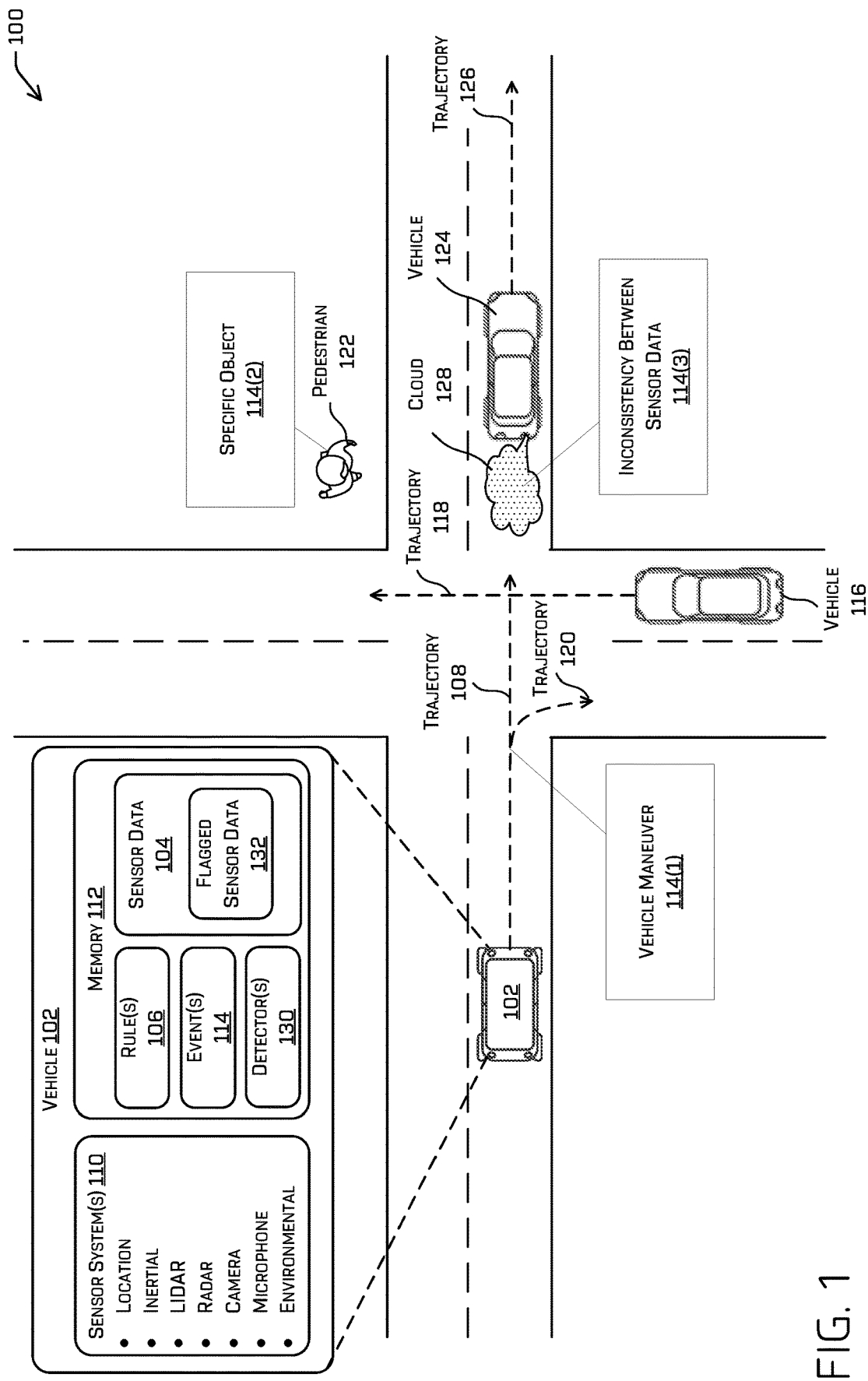
FIG. 1 is an example environment that includes a vehicle storing data according to storage rules, in accordance with embodiments of the disclosure.

As discussed above, vehicles, such as autonomous vehicles, can generate large amounts of data during operation. Storing such large amounts of data can require significant storage capacity which can be computationally and financially costly. Moreover, offloading or transferring such large amounts of sensor data is time consuming and results in significant network traffic.

This application describes techniques for event-based data logging, which can be used to manage the amount of data stored and/or transferred over a network. A computing device, such as a computing device of an autonomous vehicle, may receive sensor data representing an environment and may detect an event represented by a portion of the sensor data. The computing device may flag the portion of the sensor data associated with the event and may store, transmit, or otherwise manage the portion of the sensor data associated with the event differently than other portions of the sensor data. For instance, the computing device may store the flagged portion of the sensor data according to a first storage rule and may store other portions of the sensor data (e.g., portions that are not associated with the event) according to a second storage rule different than the first storage rule. By way of example and not limitation, the computing device may store the flagged portion of the sensor data for a longer duration and/or at a higher resolution than portions of the sensor data that are not flagged. The storage rules may additionally or alternatively include rules controlling when and how data is transmitted to one or more remote computing devices and/or how the data is stored at the remote computing device(s).

The computing device can be configured to detect any number of different events based on input received from one or more sensors or other systems of the vehicle and/or based on data received from one or more other computing devices. In this way, the computing device can be flexibly configured to preserve portions of data that are associated with any event that may be of interest, while minimizing computational resources devoted to storing, transmitting, or otherwise managing other data. In some examples, data that is not associated with an event may be overwritten, deleted, compressed (e.g., using lossy or lossless compression techniques), decayed, or the like to make room to capture or generate new data.

The event-based data logging techniques described herein may, in some examples, be used to reduce an amount of memory required to store sensor data captured by a vehicle, flag data for further processing or storage, minimize an amount of data to be transferred from a vehicle to one or more other computing devices, or otherwise improve performance of one or more computing systems of the vehicle.

As discussed above, a computing device, such as a computing device of an autonomous vehicle, may receive sensor data representing an environment. In some examples, the sensor data may be received from one or more sensors of the vehicle. By way of example and not limitation, such sensors of the vehicle can include one or more lidar sensor(s), radar sensor(s), ultrasonic transducer(s), sonar sensor(s), location sensor(s), inertial sensor(s), camera(s), microphone(s), wheel encoder(s), environment sensor(s), and/or the like. The vehicle can receive sensor data generated by the one or more sensors and use the sensor data to navigate through an environment. Additionally, the vehicle can store the sensor data in memory for later processing.

To store the sensor data, the vehicle can utilize one or more storage rules that indicate how the sensor data is to be stored in the memory. For example, the vehicle can use the sensor data to determine that an event is occurring or has occurred. In some instances, the vehicle uses raw sensor data to determine that the event is occurring or has occurred. Additionally, or alternatively, in some instances, the vehicle uses processed sensor data to determine that an event is occurring or has occurred. The storage rules may be predefined or may be updated dynamically based on, for example, conditions of the vehicle (e.g., available storage capacity, network connectivity, etc.), the environment (e.g., traffic, weather, etc.), a fleet of autonomous vehicles (e.g., proximity to other vehicles, availability of other vehicles, etc.), conditions of a communication network (e.g., network traffic, data rates, etc.), and/or other factors.

As discussed above, an event can be any number of different events based on input received from one or more sensors or other systems of the vehicle and/or based on data received from one or more other computing devices (e.g., another vehicle computing device, a mobile device of a passenger, a remote teleoperations computing device, etc.).

As used herein, the term "event" refers to any circumstance that is measurable or detectable. An event may occur at a discrete moment in time, may occur over a period of time, and/or may be ongoing. Examples of events include, but are not limited to, an inconsistency between outputs of detector(s) that analyze sensor data (from different sensor modalities or different sensors of the same modality), a maneuver of the vehicle (e.g., hard stop, swerve, no-go decision, etc.), detection of a particular object or object type (e.g., emergency vehicle, pedestrian, bicycle, pickup truck, van, a street sign, debris, etc.) located within the environment, a teleoperator intervention (e.g., a teleoperator communicating with and/or providing information to the vehicle), a user call to a teleoperator, a lack of convergence of a planner system of the vehicle, a deviation in predicted behavior of an object in the environment, a confidence level associated with a system of the vehicle being below a threshold (either instantaneously and/or for a defined period of time), unique sensor data, infrequently occurring sensor data, unusual sensor data, a vehicle diagnostic error/warning/failure, a detected sound (e.g., sound above a decibel level, a specific word detected, a siren, etc.) within the environment, an input corresponding to an emergency (e.g., actuation of a stop button, an impact, actuation of an emergency exit, etc.), etc. In a first example in which inconsistent outputs constitutes an event, the inconsistencies may be between outputs of detector(s) that analyze sensor data from two sensors of a same sensor system (e.g., detector(s) that analyze first sensor data of a first lidar sensor of a lidar sensor system detect a return at a location and detector(s) that analyze second sensor data of a second lidar sensor of the lidar sensor system detect no return at the location). In a second example in which inconsistent outputs constitutes an event, the inconsistencies may be between two outputs of detector(s) that analyze sensor data of two different sensor systems (e.g., an output from detector(s) that analyze sensor data of a first detector, such as an image-based detector that receives sensor data from one or more cameras, indicating presence of an object, and an output from detector(s) that analyze sensor data of a second detector, such as a lidar-based detector that receives sensor data from one or more lidar sensors, indicating absence of the object). In an example in which a vehicle maneuver constitutes an event, the maneuver may comprise detecting (e.g., via an inertial sensor of the vehicle, a planner system of the vehicle, a vehicle electronic control unit, or other device) an acceleration of the vehicle exceeding an acceleration threshold, or a deceleration of the vehicle exceeding a deceleration threshold. As used herein, the term "acceleration" refers to acceleration of the vehicle in any direction in three-dimensional space. In an example in which detecting an object or type of object in the environment constitutes an event, a vehicle computing device may analyze sensor data from one or more sensor systems using one or more computer vision models trained to detect and/or classify objects (e.g., vehicles, pedestrians, bicycles, buildings, faces, etc.). The foregoing are illustrative and non-limiting examples of events upon which data logging determinations can be made. Based at least in part on detecting the event, the vehicle can flag a first portion of the sensor data as corresponding to the event. The vehicle can then store the first portion of the sensor data according to a first storage rule.

In some instances, some portion of sensor data before and/or after the event may also be helpful to provide context for the event. In that case, the vehicle can further flag a second portion of the sensor data, where the second portion of the sensor data corresponds to sensor data generated prior to the event, and/or a third portion of the sensor data, where the third portion of the sensor data corresponds to sensor data generated subsequent to the event. The vehicle can then store the second portion of the sensor data and/or the third portion of the sensor data according to the first storage rule.

In some instances, the vehicle can store a fourth portion of the sensor data according to a second, different storage rule. The fourth portion of the sensor data can include sensor data that is not flagged as corresponding to the event (and/or a different event). For example, the fourth portion of the sensor data can include sensor data other than the first portion of the sensor data, the second portion of the sensor data, and/or the third portion of the sensor data.

In some instances, the storage rules indicate which data the vehicle is to be preserved and which data need not be preserved. For instance, the first storage rule can indicate sensor data that is to be preserved (e.g., not to be overwritten, deleted, compressed, decayed, or the like) when the additional sensor data is received, and the second storage rule can indicate sensor data that need not be preserved (e.g., can be overwritten, deleted, compressed, decayed, or the like). In some examples, the second storage rule may specify that data associated with the second storage rule be stored for a limited period of time (e.g., a week, a day, an hour, 10 minutes, or any other specified period of time), until additional sensor data is received, until memory of the vehicle is full or reaches a specified storage level (e.g., 95% full, 90% full, 75% full, or any other specified storage level). For example, the vehicle can preserve (e.g., refrain from overwriting, deleting, compressing, decaying, etc.) sensor data that is stored according to the first storage rule and may not preserve sensor data that is stored according to the second storage rule. For instance, the vehicle can begin overwriting, deleting, compressing, and/or decaying the fourth portion of the sensor data stored in the memory when the memory is full or reaches the specified storage level. In some instances, the vehicle may overwrite, delete, compress, and/or decay data that is not associated with an event even when the memory is not full. For instance, the vehicle can begin overwriting, deleting, compressing, and/or decaying the fourth portion of the sensor data stored in the memory even when the memory is not full.

Additionally or alternatively, in some instances, the storage rules may indicate a period of time for which the data is to be stored in the memory. For instance, the first storage rule can indicate a first period of time to store data and the second storage rule can indicate a second, different period of time to store data. For example, the vehicle can store the sensor data that is stored according to the first storage rule for the first period of time and store the sensor data that is stored according to the second storage rule for the second period of time. In some instances, the first period of time is longer than the second period of time. In some instances, the vehicle may then overwrite, delete, compress, and/or decay the sensor data from the memory after the respective period of time has elapsed. For example, the vehicle can overwrite, delete, compress, and/or decay the first portion of the sensor data, the second portion of the sensor data, and/or the third portion of the sensor data at the elapse of the first period of time. Additionally, the vehicle can delete and/or overwrite the fourth portion of the sensor data at the elapse of the second period of time.

Additionally, or alternatively, in some instances, the storage rules may indicate how the sensor data is to be stored in the memory. For example, the second storage rule can indicate that the sensor data is to be stored in compressed form and the first storage rule can indicate that the sensor data is to be stored in raw or uncompressed form. As another example, the first storage rule can indicate that the sensor data is to be stored at a first resolution and the second storage rule can indicate that the sensor data is to be stored at a second resolution lower than the first resolution. In yet another example in which the sensor data includes data from multiple different sensors and/or sensor modalities, the first storage rule can indicate that sensor data is to be stored corresponding to a first set of sensors or sensor modalities and the second storage rule can indicate that sensor data is to be stored corresponding to a second set of sensors or sensor modalities, the second set of sensors or sensor modalities including a portion (less than all) of the sensors and sensor modalities specified in the first set.

Additionally, or alternatively, in some instances, the storage rules may indicate when the sensor data is to be sent to the one or more computing devices via a wired and/or wireless network. For a first example, the vehicle can send the sensor data that is stored according to the first storage rule to the one or more computing devices before sending the sensor data that is stored according to the second storage rule. Additionally, in some instances (e.g., if the vehicle continues to receive additional sensor data when the memory is full), the vehicle can delete and/or overwrite the sensor data that is stored according to the second storage rule, which has yet to be sent to the one or more computing devices, before deleting and/or overwriting the sensor data that is stored according to the first sensor rule, which has yet to be sent to the one or more computing devices.

For a second example, the vehicle can send the sensor data that is stored according to the first storage rule to the one or more computing devices, but refrain from sending the sensor data that is stored according to second storage rule to the one or more computing devices. For instance, the vehicle can send, to the one or more computing devices, the first portion of the sensor data, the second portion of the sensor data, and/or the third portion of the sensor data. However, the vehicle may refrain from sending, to the one or more computing devices, the fourth portion of the sensor data.

In some examples, the storage rules may also control how the data is stored at the one or more computing devices. For instance, the storage rules may define how long and under what circumstances the data should be stored by the computing device(s) after it is received from the vehicle. The storage rules defining how the vehicle stores data may be the same as or different than the storage rules defining how the data is stored by the one or more computing devices.

In some instances, the one or more computing devices can use the received sensor data to update one or more detectors for use by the vehicle and/or one or more other vehicles, which may improve the performance of the one or more detectors. For example, the vehicle may use a detector to detect and/or classify an event, such as an object located in the environment. The vehicle can then flag the sensor data as corresponding to the event and send the flagged sensor data to the one or more computing devices. The one or more computing devices can use the flagged sensor data to update the detector, such as through additional training. For example, the flagged sensor data may be tagged (automatically and/or manually) to indicate one or more objects or actions depicted/captured by the sensor data. The tagged sensor data may be used as ground truth to train one or more machine learning models. For instance, the one or more computing devices can then process the tagged sensor data, such as by updating or training detectors used by the vehicle or other vehicles for object detection, classification, trajectory generation, or the like. The one or more computing devices can then send data representing the updated detector to the vehicle. The data may be transmitted substantially continuously (e.g., as it is generated), periodically (e.g., at a particular frequency), upon occurrence of a particular condition (e.g., when the vehicle is stationary or in non-use, when the vehicle is charging, when the vehicle is within range of a wireless access point, etc.). In this say, the flagged data can be used to improve the performance of the vehicle.

By storing the sensor data according to the storage rules, the vehicle can preserve sensor data that may be useful for the one or more computing devices, such as for improving the one or more detectors. For example, the vehicle may preserve sensor data that corresponds to an event until the sensor data is sent to the one or more computing devices. Additionally, the vehicle may send less than all of the sensor data that is generated by one or more sensors to the one or more computing devices. For example, the vehicle may send portions of the sensor data that correspond to events detected by the vehicle, where the portions of the sensor data may be more useful to the one or more computing devices for training or updating the detectors. Additionally, or alternatively, the vehicle may send representations (e.g., bounding boxes, etc.) of the sensor data and/or objects represented by the sensor data. This may reduce the amount of sensor data that the vehicle sends to the one or more computing devices, which can save computer resources (e.g., network bandwidth). This may also reduce the amount of sensor data that the vehicle is required to store in the memory.

As described herein, a teleoperator may interact with the vehicle in order to control or aid navigation of the vehicle. For example, the teleoperator may use an electronic device to send data (e.g., trajectory data, permission to deviate from traffic rules, enlarged/revised drive envelope, etc.) to the vehicle to assist the vehicle to navigate through an environment. In some instances, the teleoperator may include a human operator that receives at the electronic device sensor data from the vehicle and/or other data representing the vehicle in the environment. Additionally or alternatively, in some instances, the teleoperator may include computing systems leveraging simulations, artificial intelligence, machine learning, and/or other decision making strategies.

The techniques described herein can be implemented in a number of ways. Example implementations are provided below with reference to the following figures. Although discussed in the context of a vehicle, the methods, apparatuses, and systems described herein can be applied to a variety of systems.

FIG. 1 is an example environment 100 that includes a vehicle 102 that generates and stores sensor data 104 according to one or more storage rules 106 as the vehicle travels along a first trajectory 108 through the environment 100. For instance, the vehicle 102 can include one or more sensor system(s) 110 to capture the sensor data 104. The sensors system(s) 110 can include lidar sensor(s), radar sensor(s), ultrasonic transducer(s), sonar sensor(s), location sensor(s) (e.g., GPS, compass, etc.), inertial sensor(s) (e.g., inertial measurement unit(s) (IMU(s)), accelerometer(s), magnetometer(s), gyroscope(s), etc.), camera(s) (e.g., RGB, IR, intensity, depth, time of flight, etc.), microphone(s), wheel encoder(s), environment sensor(s) (e.g., temperature sensor(s), humidity sensor(s), light sensor(s), pressure sensor(s), etc.), etc. Each of the sensor system(s) 110 can include one or more individual sensors. For instance, a lidar sensor system may include multiple lidar sensors disposed about an exterior of the vehicle. As another example, a camera sensor system may include multiple cameras disposed around the exterior and/or interior of the vehicle.

While navigating, the sensor(s) of the sensor system(s) 110 can generate the sensor data 104 representing the environment 100 and/or an interior of the vehicle 102. As the sensor data 104 is being generated by the sensor system(s) 110, the vehicle 102 can be storing some or all of the sensor data 104 in memory 112. In some instances, the vehicle 102 stores the raw sensor data 104 in the memory 112. Additionally or alternatively, in some instances, the vehicle 102 may store compressed sensor data 104, processed sensor data, and/or an output or result based at least in part on the sensor data in the memory 112.

The vehicle 102 can use the sensor data 104 in substantially real time to enable to vehicle to perceive and navigate in the environment 100. For instance, the vehicle 102 may use one or more detectors, to detect event(s) 114. The event(s) 114 can include, but are not limited to, an inconsistency in the outputs of detector(s) that process sensor data (from different sensor systems or different sensors of the same sensor system), a maneuver of the vehicle (e.g., hard stop, swerve, no-go decision, etc.), detection of a particular object or object type (e.g., emergency vehicle, pedestrian, bicycle, pickup truck, etc.) located within the environment, a teleoperator intervention (e.g., a teleoperator communicating with and/or providing information to the vehicle), a user call to a teleoperator, a lack of convergence of a planner system of the vehicle, a deviation in predicted behavior of an object in the environment, a confidence level associated with a system of the vehicle being below a threshold, unique sensor data, infrequently occurring sensor data, unusual sensor data, a vehicle diagnostic error/warning/failure, a detected sound (e.g., sound above a decibel level, a specific word detected, a siren, etc.) within the environment, an input corresponding to an emergency (e.g., actuation of a stop button, an impact, actuation of an emergency exit, etc.). The foregoing are illustrative and non-limiting examples of events upon which data logging determinations can be made.

As illustrated in FIG. 1, a second vehicle 116 is traveling along a trajectory 118 that intersects with the first trajectory 108 of the vehicle 102. In order to avoid the second vehicle 116, the vehicle 102 can determine to navigate along a second trajectory 120. As such, the vehicle 102 can analyze the sensor data 104 to detect a first event 114(1) associated with a vehicle maneuver. The vehicle maneuver can include a acceleration or deceleration of the vehicle 102 exceeding a threshold acceleration or deceleration, respectively, in order to switch from the first trajectory 108 to the second trajectory 120. The acceleration or deceleration may be measured in any direction (e.g., longitudinal, lateral, or vertical). For instance, the vehicle 102 can determine, based at least in part on the sensor data 104, that the vehicle 102 is deaccelerating at 3.8 m/s$^2$. The vehicle 102 can further determine that the first event 114(1) includes a deceleration exceeding a deceleration threshold of 3.0 m/s$^2$. Therefore, the vehicle 102 can determine that the deceleration of the vehicle 102 exceeds the deceleration threshold and can store sensor data associated with time periods before, during, and/or after the event according to a first storage rule.

For a second example, and as also illustrated in FIG. 1, a pedestrian 122 can be located in the environment 100 and proximate to the vehicle 102. As such, the vehicle 102 can analyze the sensor data 104 to detect a second event 114(2) associated with a specific object type (a "pedestrian" object type in this example). The specific object type can include pedestrians located within the environment 100. For instance, the vehicle 102 can determine, based at least in part on analyzing the sensor data 104, that the sensor data 104 (e.g., image data generated by a camera) represents the pedestrian 122 located within the environment 100. Therefore, the vehicle 102 can determine that the second event 114(2) is occurring and can store the sensor data representing the pedestrian 122 according to the first storage rule.

For a third example, and as also illustrated in FIG. 1, a third vehicle 124 can be traveling along a trajectory 126. While traveling, the third vehicle 124 can be outputting an exhaust cloud 128 into the environment 100. The vehicle 102 can analyze first sensor data (e.g., image data) generated by a first sensor (e.g., a camera) or sensor system (e.g., vision system) and, based at least in part on the analysis, determine that the first sensor data does not detect an object at the location of the exhaust cloud 128. However, the vehicle 102 can analyze second sensor data 104 (e.g., lidar data) generated by a second sensor (e.g., a lidar sensor) and, based at least in part on the analysis, determine that the second sensor data 104 detects an object at the location of the exhaust cloud 128. In that case, the vehicle 102 can determine that the third event 114(3) includes inconsistencies between detector(s) 130 that analyze sensor data of the first sensor or sensor system and detector(s) 130 that analyze sensor data of the second sensor or sensor system. As such, the vehicle 102 can determine that the third event 114(3) is occurring (e.g., an inconsistency between the outputs) and can store sensor data associated with the third event 114(3) (i.e., the sensor data of the first sensor and the sensor data of the second sensor) for further processing. For instance, in some examples, the sensor data may be used analyzed and used to train one or more detectors 130 to more accurately detect events like those represented in the inconsistent sensor data.

In some instances, the vehicle 102 can use detector(s) 130 to determine that the third event 114(3) is occurring. For example, a detector 130 can be configured to analyze a type of sensor data 104 to determine if the type of sensor data 104 represents an object. For instance, a first detector can analyze a first type of sensor data 104 (e.g., the image data). Based at least in part on the analysis, the first detector can output data indicating that the pedestrian 122 was not detected by the first detector (e.g., indicating an absence of the pedestrian 122). Additionally, a second detector can analyze a second type of sensor data (e.g., the lidar data). Based at least in part on the analysis, the second detector can output data indicating that the pedestrian 122 was detected by the second detector. The vehicle 102 can then determine that the third event 114(3) is occurring based at least in part on the output from the first detector indicating that the pedestrian 122 was not detected and the output from the second detector indicating that the pedestrian 122 was detected.

In any or all of the examples above, the vehicle 102 can utilize the storage rule(s) 106 when storing the sensor data 104 in the memory 112. For example, based at least in part on detecting the first event 114(1), the vehicle 102 can flag a first portion of the sensor data 104 to generate flagged sensor data 132 as corresponding to the first event 114(1). In some instances, the flagged sensor data 132 includes sensor data that was generated by one or more of the sensor(s) while the first event 114(1) was occurring (e.g., while the deceleration of the vehicle 102 exceeded the deceleration threshold). The vehicle 102 can then store the flagged sensor data 132 according to a first storage rule of the storage rules 106.

In some instances, the vehicle 102 can further flag a second portion of the sensor data generated prior to the first event 114(1) and/or a third portion of the sensor data generated subsequent to the first event 114(1). For example, the vehicle 102 can use the first portion of the sensor data to determine a time at which the first event 114(1) occurred. The vehicle 102 can then determine a first period of time that occurred prior to the first event 114(1) and/or a second period of time that occurred subsequent to the first event 114(1). In some instances, the vehicle 102 determines the first period of time and/or the second period of time based at least in part on the event type associated with the first event 114(1). For instance, the vehicle 102 can determine the first period of time and/or the second period of time based at least in part on the event type including a particular vehicle maneuver. By way of example and not limitation, if the vehicle 102 determines that a hard-braking maneuver occurred, the vehicle 102 may flag sensor data corresponding to a time period of the event (e.g., 1 second) during which deceleration of the vehicle exceeded a deceleration threshold (e.g., 3.0 m/s), a first time period prior to occurrence of the event (e.g., 10 seconds just prior to the event), and a second time period subsequent to the event (e.g., 5 seconds just after the event). Thus, the flagged sensor data 132 associated with the event in this example may comprise the time period of the event, the first time period prior to the event, and the second time period subsequent to the event. Thus, the flagged sensor data 132 can be stored according to the first storage rule to preserve the flagged sensor data 132 for analysis and/or processing. In some examples, the flagged sensor data 132 can be used to refine one or more rules or models used to generate trajectories for the vehicle 102. In some examples, the flagged sensor data 132 can be stored for use in determining compliance with one or more traffic laws.

In some instances, the vehicle 102 can store a fourth portion of the sensor data 104 according to a second, different storage rule of the storage rules 106. The fourth portion of the sensor data 104 can include sensor data 104 that was not flagged by the vehicle 102. For example, the fourth portion of the sensor data 104 can include sensor data other than the first portion of the sensor data, the second portion of the sensor data, and/or the third portion of the sensor data.

The events 114(1), 114(2), and 114(3) are merely a few illustrative examples of events that the vehicle 102 can be configured to detect and use as a basis for event-based data logging. Numerous other events are possible and the vehicle 102 can perform similar processes and/or techniques to flag additional portion(s) of the sensor data as corresponding additional event(s) 114. For example, the vehicle 102 can flag portion(s) of the sensor data 132 as corresponding to the second event 114(2). The vehicle 102 can then store those portion(s) of the flagged sensor data 132 according to the first storage rule. Additionally, the vehicle 102 can flag portion(s) of the sensor data 132 as corresponding to the third event 114(3). The vehicle 102 can then store those portion(s) of the flagged sensor data 132 according to the first storage rule. Additionally, while only first and second storage rules are described, in other examples any number of different storage rules specifying different durations, amounts, types, and/or other characteristics of sensor data to preserve and/or send to one or more other computing devices.

In some instances, the storage rules 106 can indicate which sensor data 104 the vehicle 102 can overwrite and/or delete when additional sensor data 104 is generated from the sensor system(s) 110. While some of the examples herein refer to overwriting or deleting data, unless otherwise indicated, the data in these examples may additionally or alternatively be compressed, decayed, or otherwise reduced. For instance, the first storage rule can indicate that flagged sensor data 132 is not to be overwritten and/or deleted when the additional sensor data is received, and the second storage rule can indicate that sensor data that is not flagged is to be overwritten and/or deleted when additional sensor data is received. For example, the vehicle 102 can refrain from overwriting and/or deleting the flagged sensor data 132 that is stored according to the first storage rule and can overwrite and/or delete the sensor data 104 that is stored according to the second storage rule.

Additionally or alternatively, in some instances, the storage rules 106 can indicate a period of time for which the sensor data 104 is to be stored in the memory 112. For instance, the first storage rule of the storage rules 106 can indicate a first period of time for which the flagged sensor data 132 is to be stored and the second storage rule of the storage rules 106 can indicate a second period of time for which sensor data that is not flagged is to be stored. For example, the vehicle 102 can store the flagged sensor data 132 that is stored according to the first storage rule for the first period of time and store the sensor data that is not flagged according to the second storage rule for the second, different period of time. In some instances, the first period of time is greater than the second period of time. In some instances, the vehicle 102 can then overwrite and/or delete the flagged sensor data 132 and/or the unflagged sensor data at the elapse of the respective period of time. For example, the vehicle 102 can overwrite and/or delete the flagged sensor data 132 that is stored according to the first storage rule at the elapse of the first period of time, and can overwrite and/or delete the sensor data 104 that is stored according to the second storage rule at the elapse of the second period of time.

Additionally or alternatively, in some instances, the storage rules 106 can indicate how the sensor data 104 is stored in the memory 112. For instance, the first storage rule of the storage rules 106 can indicate the flagged sensor data 132 is to be stored in raw or uncompressed form and the second storage rule of the storage rules 106 can indicate that the unflagged sensor data is to be stored in a compressed form. As another example, the first storage rule of the storage rules 106 can indicate the flagged sensor data 132 is to be stored at a first resolution and the second storage rule of the storage rules 106 can indicate that the unflagged sensor data is to be stored at a second resolution lower than the first resolution. For example, the vehicle 102 can store the flagged sensor data 132 that is stored according to the first storage rule in the memory 112 in its raw, uncompressed form and/or at the first resolution. Additionally, the vehicle 102 can store the unflagged sensor data that is stored according to the second storage rule by compressing the unflagged sensor data and storing the compressed sensor data in the memory 112 and or storing the unflagged sensor data at a second resolution lower than the first resolution.

Additionally or alternatively, in some instances, the storage rules 106 can indicate when the sensor data 104 is to be sent to the one or more computing devices. For a first example, the vehicle 102 can send the flagged sensor data 132, which is stored according to the first storage rule, to the one or more first computing devices before sending unflagged sensor data, which is stored according to the second storage rule, to the second one or more computing devices (e.g., a teleoperations computing device, cloud storage, or other local or remote computing device). Additionally, if the vehicle 102 continues to receive additional sensor data 104 when the memory 112 is full or above a threshold level, the vehicle 102 can overwrite the unflagged sensor data that is stored according to the second storage rule, which has yet to be sent to the one or more computing devices, before overwriting the flagged sensor data 132 that is stored according to the first storage rule, which has yet to be sent to the one or more computing devices. For a second example, the vehicle 102 can send the flagged sensor data 132, which is stored according to the first storage rule, to the one or more computing devices, but refrain from sending the unflagged sensor data, which is stored according to second storage rule, to the one or more computing devices. In some examples, the sending may be performed via wired and/or wireless networks or via manual swapping of memory from the first computing device to the second computing device. In still other examples, the flagged data and/or the unflagged data may not be transmitted to a second computing device.

Figure 2A:
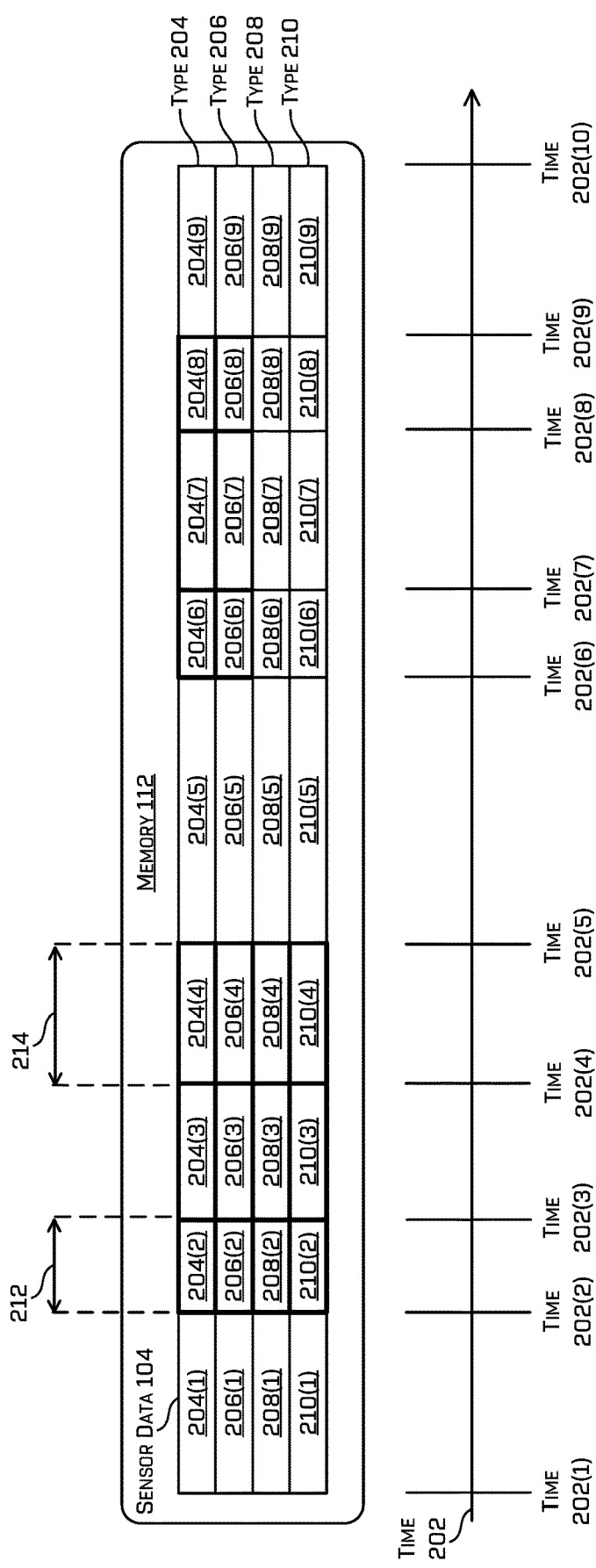
FIG. 2A is an example of storing data in a memory according to storage rules, in accordance with embodiments of the disclosure.

FIG. 2A is an example of storing the sensor data 104 in the memory 112 according to the storage rule(s) 106. As shown, the flags may include one or more time stamps indicating a time, times, or ranges of times, at which the sensor data associated with the event was collected. In some examples, the flags may additionally or alternatively include other data such as, for example, contextual tags indicating a subject of the sensor data (e.g., based on classification of one or more objects in the sensor data by a perception component of the vehicle 102), location data (e.g., geolocation data at which the sensor data was collected), environmental conditions (e.g., weather data, temperature data or other data of the environmental conditions under which the sensor data was collected), vehicle diagnostic data at the time the sensor data was collected, or the like. For example, the vehicle 102 can be storing, over the course of a first period of time 202, the sensor data 104 in the memory 112 according to the storage rule(s) 106. The sensor data 104 can include a first type 204 of the sensor data 104 generated by a first type of sensor (e.g., a camera), a second type 206 of the sensor data 104 generated by a second type of sensor (e.g., a lidar sensor), a third type 208 of the sensor data 104 generated by a third type of sensor (e.g., a location sensor), and a fourth type 210 of the sensor data 104 generated by a fourth type of sensor (e.g., an inertial sensor), and so forth.

In the example of FIG. 2A, while generating the sensor data 104, the vehicle 102 can analyze the sensor data 104 to determine that a first event 114 (e.g., the first event 114(1)) occurs from time 202(3) and time 202(4). As such, the vehicle 102 can flag some or all of the sensor data corresponding to the time period from time 202(3) and time 202(4) as corresponding to the first event 114. In the illustrated example, all of the types of sensor data generated during the time period between the time 202(3) and the time 202(4) is flagged. For example, the vehicle 102 can flag a portion 204(3) of the first type 204 of the sensor data 104, a portion 206(3) of the second type 206 of the sensor data 104, a portion 208(3) of the third type 208 of the sensor data 104, and a portion 210(3) of the fourth type 210 of the sensor data 104. In other examples, the vehicle 102 may flag specific types of the sensor data 104. For a first example, the vehicle 102 may flag the sensor data 104 that represents the event 114. The sensor data 104 that represents the event 114 may include sensor data 104 that the vehicle 102 analyzed to detect the event. For a second example, the vehicle 102 may flag sensor data 104 other than the data representing the event 114. For instance, the vehicle 102 may detect, based on first data (e.g., data from a wheel encoder or inertial measurement unit) an event (e.g., a hard-braking event), and based on the event may flag second data (e.g., image data or lidar data depicting surroundings of the vehicle leading up to, during, and/or after the event).

Additionally, the vehicle 102 can determine, based at least in part on the event type associated with the event 114, a first amount of time 212 prior to the first event 114, where the first amount of time 212 is between time 202(2) and time 202(3). The vehicle 102 can then flag the sensor data 104 corresponding to the time period between the time 202(2) and the time 202(3). For example, the vehicle 102 can flag a portion 204(2) of the first type 204 of the sensor data 104, a portion 206(2) of the second type 206 of the sensor data 104, a portion 208(2) of the third type 208 of the sensor data 104, and a portion 210(2) of the fourth type 210 of the sensor data 104.

Furthermore, the vehicle 102 can determine, based at least in part on the event type, a second amount of time 214 that occurs subsequent to the first event 114, where the second amount of time 214 is between time the 202(3) and time 202(4). The vehicle 102 can then flag the sensor data 104 corresponding to the time period between the time 202(3) and the time 202(4). For example, the vehicle 102 can flag a portion 204(4) of the first type 204 of the sensor data 104, a portion 206(4) of the second type 206 of the sensor data 104, a portion 208(4) of the third type 208 of the sensor data 104, and a portion 210(4) of the fourth type 210 of the sensor data 104.

As shown in the example of FIG. 2A, the second amount of time 214 and/or the amount of flagged sensor data 104 corresponding to the second amount of time 214 is greater than the first amount of time 212 and/or the amount of flagged sensor data 104 corresponding to the first amount of time 212. As such, the vehicle 102 can asymmetrically flag sensor data 104 that is generated prior to the event 114 and sensor data 104 that is generated subsequent to the event 114. In some instances, the vehicle 102 asymmetrically flags the sensor data 104 based at least in part on the event type. For example, if the event type includes a vehicle maneuver, the vehicle 102 may determine that the sensor data 104 that is generated subsequent to the vehicle maneuver is more important than the sensor data 104 that is generated prior to the vehicle maneuver (e.g., in order to determine if the vehicle maneuver was necessary). As such, the vehicle 104 may flag a greater portion of the sensor data 104 that is generated subsequent to the vehicle maneuver than the sensor data 104 that is generated prior to the vehicle maneuver. In other examples, the vehicle 104 may flag a greater portion of the sensor data 104 that is generated prior to the vehicle maneuver than the sensor data 104 that is generated subsequent to the vehicle maneuver (e.g., in order to determine what led to or caused a particular maneuver). The amount and/or duration of sensor data that is flagged may vary depending on the particular event of the event type (e.g., different amounts of sensor data may be flagged before and/or after a swerve, than for a hard braking event, than for another vehicle maneuver).

In the example of FIG. 2A, the vehicle 102 may analyze the sensor data 104 to determine that a second event 114 (e.g., the second event 114(2)) occurs between time 202(7) and time 202(8). The vehicle 102 may further determine, based at least in part on the event type, to only flag certain portions or types the sensor data 104 as corresponding to the second event 114. For example, the vehicle 102 may flag a portion 204(7) of the first type 204 (e.g., camera sensor data) of the sensor data 104 and a portion 206(7) of the second type 206 (e.g., lidar sensor data) of the sensor data 104. However, the vehicle 102 may refrain from flagging a portion 208(7) of the third type 208 (e.g., location sensor data) of the sensor data 104 and a portion 210(7) of the fourth type 210 (e.g., vehicle system diagnostic data) of the sensor data 104. In some instances, the vehicle 102 may flag the sensor data 104 that represents the event 114 (e.g., the sensor data 104 used to detect the event 114). In other instances, the vehicle may 102 flag sensor data 104 other than that representing the event 114.

Additionally, the vehicle 102 can determine, based at least in part on the event type, a first amount of time that occurs prior to the second event 114, where the first amount of time is between time 202(6) and time 202(7). The vehicle 102 can then flag the certain types of the sensor data 104 corresponding to the time period between the time 202(6) and the time 202(7). For example, the vehicle 102 can flag a portion 204(6) of the first type 204 of the sensor data 104 and a portion 206(6) of the second type 206 of the sensor data 104. However, the vehicle 102 can refrain from flagging a portion 208(6) of the third type 208 of the sensor data 104 and a portion 210(6) of the fourth type 210 of the sensor data 104.

Furthermore, the vehicle 102 can determine, based at least in part on the event type, a second amount of time that occurs subsequent to the first event 114, where the second amount of time is between time 202(8) and time 202(9). The vehicle 102 can then flag the certain types of the sensor data 104 corresponding to the time period between the time 202(8) and the time 202(9). For example, the vehicle 102 can flag a portion 204(8) of the first type 204 of the sensor data 104 and a portion 206(8) of the second type 206 of the sensor data 104. However, the vehicle 102 can refrain from flagging a portion 208(8) of the third type 208 of the sensor data 104 and a portion 210(8) of the fourth type 210 of the sensor data 104. In this example, the time period prior to the event and the time period after the event are symmetrically flagged. That is, the time period prior to the event (from 202(6) to 202(7)) is substantially the same as the time period subsequent to the event (from 202(8) to 202(9)).

In some instances, the vehicle 102 stores the flagged sensor data 132 according to a first storage rule, which is indicated by the bold cells in the example of FIG. 2A. The vehicle 102 can further store the other portions of the sensor data 104 in according to a second storage rule. For example, the vehicle 102 can store portions 204(1), 204(5), and 204(9) of the first type 204 of the sensor data 104, portions 206(1), 206(5), and 206(9) of the second type 206 of the sensor data 104, portions 208(1) and 208(5)-(9) of the third type 208 of the sensor data 104, and portions 210(1) and 210(5)-(9) of the fourth type 210 of the sensor data 104 according to the second storage rule.

FIG. 2B is an example of overwriting the sensor data 104 stored in the memory 112 according to the storage rule(s) 106, in accordance with embodiments of the disclosure. For example, the vehicle 102 can continue receiving additional sensor data 104 generated by the sensor(s). In some examples (e.g., when the memory 112 is full or is above a threshold storage level), the vehicle 102 may overwrite at least some of the sensor data 104 stored in the memory 112 with the additional sensor data 104 being received by the sensor system(s) 110. As such, and as illustrated in the example of FIG. 2B, the vehicle 102 can overwrite the sensor data 104 according the storage rules 106 used to store the sensor data 104. For example, the vehicle 102 can overwrite the sensor data 104 that is stored according to the second storage rule, but refrain from overwriting the flagged sensor data (the flagged sensor data represented by the cells shown in bold) that is stored according to the first storage rule. Overwritten or deleted data is shown as struck-through in FIG. 2B.

For example, the vehicle 102 can respectively overwrite the portions 204(1), 204(5), and 204(9) of the first type 204 of the sensor data 104 with portions 204(10), 204(11), and 204(12) of the first type 204 of the sensor data 104. The vehicle 102 can respectively overwrite the portions 206(1), 206(5), and 206(9) of the second type 206 of the sensor data 104 with portions 206(10), 206(11), and 206(12) of the second type 206 of the sensor data 104. Additionally, the vehicle 102 can respectively overwrite the portions 208(1) and 208(5)-(9) of the third type 208 of the sensor data 104 with portions 208(10) and 208(11)-(15) of the third type 208 of the sensor data 104. Furthermore, the vehicle 102 can respectively overwrite the portions 210(1) and 210(5)-(9) of the fourth type 210 of the sensor data 104 with portions 210(10) and 210(11)-(15) of the fourth type 210 of the sensor data 104.

Even though the example of FIG. 2B illustrates overwriting each type of sensor data 104 with a similar type of sensor data 104, in other examples, a type of sensor data 104 may be overwritten with a different type of sensor data 104. For example, the vehicle 102 can overwrite a portion of the first type 204 of the sensor data 104 with a portion of the second type 206 of the sensor data 104.

Figure 3:
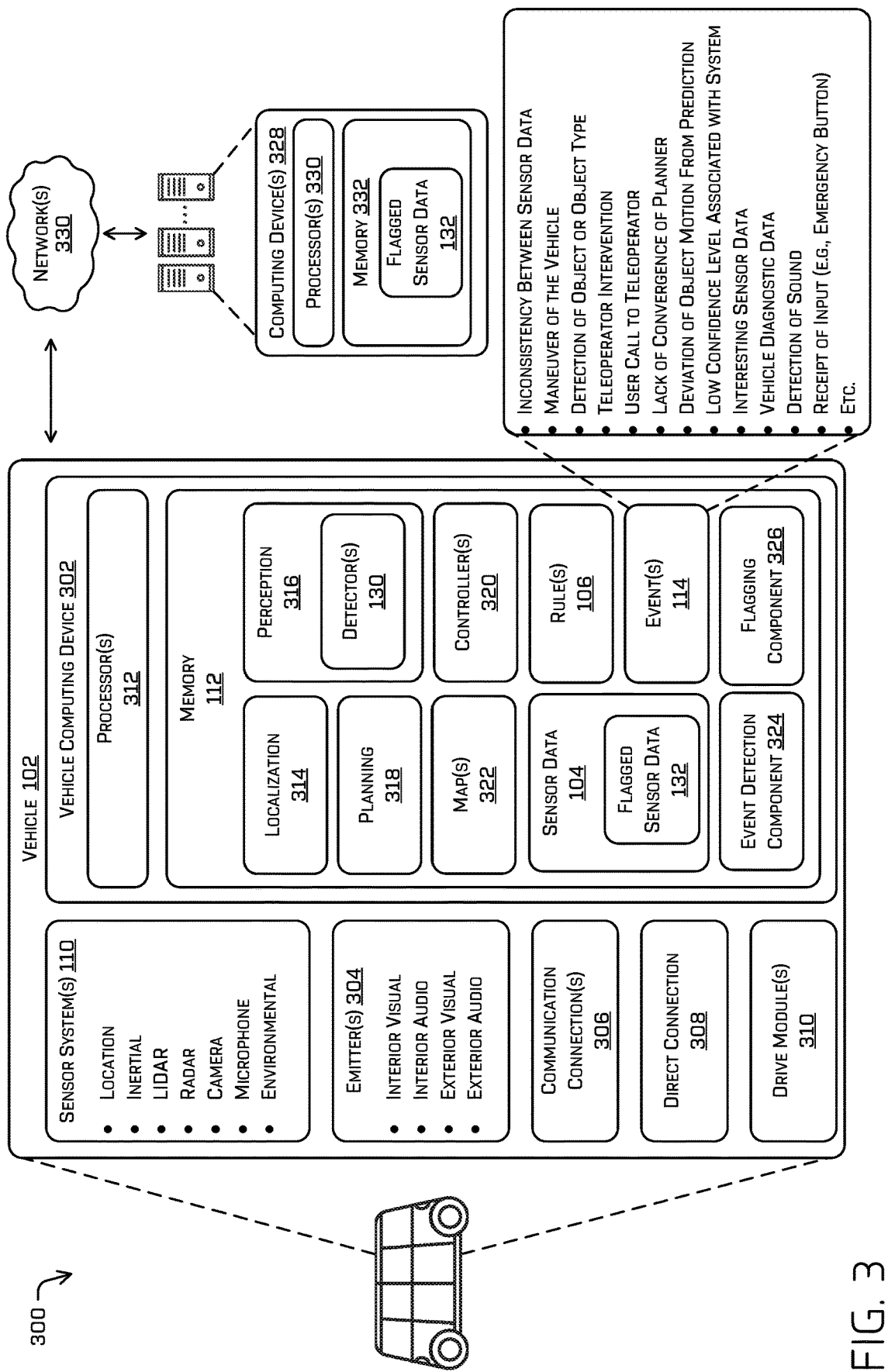
FIG. 3 depicts a block diagram of an example system for implementing the techniques described herein, in accordance with embodiments of the disclosure.

FIG. 3 depicts a block diagram of an example system 300 for implementing the techniques described herein, in accordance with embodiments of the disclosure. In at least one example, the system 300 can include the vehicle 102. The vehicle 102 can include a vehicle computing device 302, one or more sensor systems 110, one or more emitters 304, one or more communication connections 306, at least one direct connection 308, and one or more drive modules 310.

The vehicle computing device 302 can include one or more processors 312 and the memory 112 communicatively coupled with the one or more processors 312. In the illustrated example, the vehicle 102 is an autonomous vehicle. However, the vehicle 102 may be any other type of vehicle (e.g., a manually driven vehicle, a semi-autonomous vehicle, etc.), or any other system having at least an image capture device. In the illustrated example, the memory 112 of the vehicle computing device 302 stores a localization component 314, a perception component 316, a planning component 318, one or more system controllers 320, one or more maps 322, an event detection component 324, and a flagging component 326. Though depicted in FIG. 3 as residing in the memory 112 for illustrative purposes, it is contemplated that the localization component 314, the perception component 316, the planning component 318, the one or more system controllers 320, the one or more maps 322, the event detection component 324, and the flagging component 326 can additionally, or alternatively, be accessible to the vehicle 102 (e.g., stored on, or otherwise accessible by, memory remote from the vehicle 102).

In at least one example, the localization component 314 can include functionality to receive the sensor data 104 from the sensor system(s) 110 and to determine a position and/or orientation of the vehicle 102 (e.g., one or more of an x-, y-, z-position, roll, pitch, or yaw). For example, the localization component 314 can include and/or request/receive a map of an environment and can continuously determine a location and/or orientation of the vehicle 102 within the map. In some instances, the localization component 314 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 102. In some instances, the localization component 314 can provide data to various components of the vehicle 102 to determine an initial position of the vehicle 102 for generating a candidate trajectory, as discussed herein.

In some instances, the perception component 316 can include functionality to perform object detection, segmentation, and/or classification. In some instances, the perception component 316 can provide processed sensor data 104 that indicates a presence of an object that is proximate to the vehicle 102 and/or a classification of the object as an object type (e.g., car, pedestrian, cyclist, animal, building, tree, road surface, curb, sidewalk, unknown, etc.). In additional and/or alternative examples, the perception component 316 can provide processed sensor data 104 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

As shown, in some instances, the perception component 316 may include the detector(s) 130. A detector 130 may include functionality to analyze a type of sensor data 104 and, based at least in part on the analysis, output data indicating whether the type of sensor data 104 represents an object. The perception component 316 may then perform the object detection (e.g., using a detector 130) on the type of sensor data 104 in order to classify the object. For example, a detector 130 may analyze image data generated by a camera. Based at least in part on the analysis, the detector 130 may determine that the image data represents an object. The perception component 316 can then perform object detection on the image data, using one or more detectors 130 associated with different object types, to determine that the object represented by the image data includes an object type.

In general, the planning component 318 can determine a path for the vehicle 102 to follow to traverse through an environment. For example, the planning component 318 can determine various routes and trajectories and various levels of detail. For example, the planning component 318 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 318 can generate an instruction for guiding the vehicle 102 along at least a portion of the route from the first location to the second location. In at least one example, the planning component 318 can determine how to guide the vehicle 102 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 102 to navigate.

In at least one example, the planning component 318 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 102 can stop to pick up a passenger. In at least one example, the planning component 318 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

In at least one example, the vehicle computing device 302 can include one or more system controllers 320, which can be configured to control steering, propulsion, braking, safety, emitters, communication, and other systems of the vehicle 102. These system controller(s) 320 can communicate with and/or control corresponding systems of the drive module(s) 310 and/or other components of the vehicle 102.

The memory 112 can further include one or more maps 322 that can be used by the vehicle 102 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps 322 can include at least one map (e.g., images and/or a mesh). In some example, the vehicle 102 can be controlled based at least in part on the maps 322. That is, the maps 322 can be used in connection with the localization component 314, the perception component 316, and/or the planning component 318 to determine a location of the vehicle 102, identify entities in an environment, and/or generate routes and/or trajectories to navigate within an environment.

The event detection component 324 can analyze the sensor data 104 and, based at least in part on the analysis, determine that an event 114 is occurring and/or has occurred. As shown, the event(s) 114 may include, but are not limited to, an inconsistency between outputs of detector(s) that analyze sensor data (from different sensor modalities or different sensors of the same modality), a maneuver of the vehicle, detection of an object or object type located within the environment, a teleoperator intervention (e.g., a teleoperator communicating with and/or providing information to the vehicle), a user call to a teleoperator, a lack of convergence of a planning component, a deviation in predicted behavior of an object in the environment, a confidence level associated with a system of the vehicle 102 being below a threshold, unique sensor data, infrequently occurring sensor data, unusual sensor data, a vehicle diagnosis error/warning/failure, a sound within the environment, an input corresponding to an emergency, arrival at a pickup location, arrival at a destination location, entry of the vehicle by a passenger, and receipt of a "start ride" command, etc.

Details of detecting inconsistency between outputs, detecting a maneuver of the vehicle, and detecting an object or object type located in the environment are described above.

The vehicle 102 can detect a teleoperator intervention when a teleoperator communicates with the vehicle 102. For example, the teleoperator can use one or more computing device(s) to send data to the vehicle 102, where the data causes or is used by the vehicle 102 to navigate, such as along a trajectory. Based at least in part on receiving the data, the vehicle 102 can detect the event corresponding to the teleoperator intervention. Additionally, in some instances, a user located within the vehicle 102 can initiate a call to the teleoperator (e.g., via a touch or voice interface of the vehicle, via a mobile device of the user, etc.). Based at least in part on the user initiating the call, the vehicle 102 can detect the event corresponding to the call to the teleoperator.

The vehicle 102 can detect the lack of convergence of the planning component 318 when generating one or more trajectories for the vehicle 102. For example, the planning component 318 may generate multiple potential trajectories for the vehicle 102. The vehicle 102 can perform one or more operations to optimize or otherwise select a trajectory from among the multiple potential trajectories to use to control the vehicle 102. The vehicle 102 may detect the lack of convergence when, for example, respective cost(s) of the one or more trajectories exceeds a cost threshold, when changes between costs of trajectories continue to exceed a cost threshold, and/or when a trajectory is not selected (e.g., based on the costs being above the cost threshold) within a certain period of time and/or within a certain number of iterations. The vehicle 102 can detect an event 114 based at least in part on detecting the lack of convergence.

The vehicle 102 may predict the behavior (e.g., trajectory) of one or more objects in the environment. For instance, a perception component of the vehicle may detect, classify, and/or track one or more objects in the environment and may predict (e.g., based on tracked motion of the object, the classification of the object, a location of the object in the environment, etc.) a behavior of the object. For instance, the vehicle 102 may predict that a pedestrian walking on a sidewalk will continue to walk on the sidewalk, that a pedestrian stopped at an intersection will attempt to cross the street, or that a vehicle traveling in a lane with its turn signal on will change lanes. The vehicle 102 can then compare the predicted behavior with the actual behavior of the object. The vehicle 102 can detect an event based at least in part on the actual behavior of the object differs by a threshold amount from the predicted behavior of the object. The difference may be quantified by comparing a predicted trajectory to an actual measured trajectory of the object for a point in time or a range of times. In some examples, sensor data associated with an event in which the actual behavior of the object differs from the predicted behavior of the object may transmitted to a remote computing device and/or use to train a prediction component of the vehicle to better predict motion of such objects in the future.

The vehicle 102 may detect the confidence level associated with a system being below the threshold when a confidence level associated with an object detection or classification is below the threshold. For example, the vehicle 102 may analyze the sensor data 104 in order to detect entities and/or specific object types located in the environment. While performing the analysis, the vehicle 102 can determine a confidence level indicating a likelihood that the sensor data 104 represents an object and/or a specific object type located in the environment. The vehicle 102 can then compare the confidence level to a threshold. The vehicle 102 can then detect an event 114 based at least in part on the confidence level of the classification being below the threshold.

Additionally, the vehicle 102 can detect the confidence level associated with the system being below the threshold when a confidence level associated with a generated trajectory is below a threshold. For example, the vehicle 102 can generate one or more trajectories for the vehicle 102. For each trajectory, the vehicle 102 can determine a respective confidence level indicating a likelihood that the trajectory will successfully navigate the vehicle 102 from the first location to the second location with minimal costs (e.g., costs below a threshold cost). The vehicle 102 can then compare the confidence level to a threshold. The vehicle 102 can then detect an event based at least in part on the confidence level of the optimal trajectory being below the threshold.

In some instances, the vehicle 102 may detect a sound event within the vehicle or in an environment of the vehicle by detecting a sound that exceeds a threshold decibel level. For example, the vehicle 102 may analyze the sensor data 104 (e.g., audio data generated by microphone(s)) to determine a decibel level associated with sound represented by the sensor data 104. The vehicle 102 may then detect the event 114 by determining that the sound exceeds the threshold decibel level. The threshold decibel level may include, but is not limited to, 50 decibels, 70 decibels, 100 decibels, and/or the like.

Additionally, or alternatively, the vehicle 102 may detect a sound event by detecting a sound type. The sound type may include, but is not limited to, a siren, one or more specific words (e.g., stop, help, look out, etc.), glass breaking, and/or the like. For example, the vehicle 102 may analyze the sensor data 104 (e.g., audio data generated by microphone(s)) using one or more algorithms associated with sound recognition and/or speech recognition. Based at least in part on the analysis, the vehicle 102 may classify the sound represented by the sensor data 104. The vehicle 102 may then detect the event 114 based at least in part on the classification including the sound type. For instance, if the vehicle 102 detects that the classification of the sound includes a siren, and the sound type includes a siren, then the vehicle 102 may detect the event 114.

In some instances, the vehicle 102 can detect the input via an input device (e.g., a button, knob, lever, etc.) located within the vehicle 102.

In some instances, the vehicle 102 can detect unique sensor data 104, infrequently occurring sensor data 104, unusual sensor data, sensor data, and/or the like by determining that the sensor data 104 represents an object and/or sound that the vehicle 102 cannot classify. For example, the vehicle 102 can analyze the sensor data 104 using one or more detectors 130 associated with one or more object types. During the analysis, the vehicle 102 may not be able of classifying an object represented by the sensor data 104. As such, the vehicle 102 can detect an event 114 based at least in part on the vehicle 102 being unable to classify the object.

Additionally, in some instances, the vehicle 102 can detect sensor data 104 that represents an object and/or sound that is detected at a frequency that is less than a threshold frequency. The threshold frequency may include, but is not limited to, once every minute, once every hour, once every day, and/or any other frequency. For example, the vehicle 102 may determine that the sensor data 104 represents a bicycle, where the vehicle 102 detects bicycles once every hour. Additionally, the threshold frequency may include one detection every minute. Therefore, since the vehicle 102 detects bicycles (e.g., one every hour) at a frequency that is less than the threshold frequency (e.g., once every minute), the vehicle 102 may detect an event 114 based at least in part on the vehicle 102 detecting the bicycle.

The flagging component 326 can flag the sensor data to generate flagged sensor data 132 as corresponding to an event 114. In some examples, to flag the sensor data, the flagging component 326 associates the sensor data with metadata that indicates that the sensor data is associated with the event. Additionally, in some instances, the flagging component 326 can flag sensor data that is generated a first amount of time before the event 114 and/or a second amount of time subsequent to the event 114. In some instances, the first amount of time may be equal to the second amount of time. In some instances, the first amount of time may be different than the second amount of time. In some instances, the first amount of time and/or the second amount of time may be determined based at least in part on the event type associated with the event 114 that is occurring.

In some instances, aspects of some or all of the components discussed herein can include any models, classifiers, and/or machine learning algorithms. For example, in some instances, some or all of the components in the memory 112 can be implemented at least in part as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

As discussed above, in at least one example, the sensor system(s) 110 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 110 can include multiple instances of each of these or other types of sensors. For instance, the lidar sensors can include individual lidar sensors located at the corners, front, back, sides, and/or top of the vehicle 102. As another example, the camera sensors can include multiple cameras disposed at various locations about the exterior and/or interior of the vehicle 102. The sensor system(s) 110 can provide input to the vehicle computing device 302. Additionally or alternatively, the sensor system(s) 110 can send the sensor data 104, via the one or more networks 330, to the one or more computing device(s) 328 at a particular frequency, after a lapse of a predetermined period of time, upon occurrence of one or more conditions, in near real-time, etc. In some examples, the storage rules may also control or specify how the data is to be stored at the one or more computing devices 328. For instance, the storage rules may define how long and under what circumstances the data should be stored by the computing device(s) 328 after it is received from the vehicle 102. The storage rules defining how the vehicle 102 stores data may be the same as or different than the storage rules defining how the data is stored by the one or more computing devices 328.

The vehicle 102 can also include one or more emitters 304 for emitting light and/or sound, as described above. The emitters 304 in this example include interior audio and visual emitters to communicate with passengers of the vehicle 102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 304 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 can also include one or more communication connection(s) 306 that enable communication between the vehicle 102 and one or more other local or remote computing device(s). For instance, the communication connection(s) 306 can facilitate communication with other local computing device(s) on the vehicle 102 and/or the drive module(s) 310. Also, the communication connection(s) 306 can allow the vehicle to communicate with other nearby computing device(s) (e.g., other nearby vehicles, traffic signals, etc.). The communications connection(s) 306 also enable the vehicle 102 to communicate with a remote teleoperations computing device or other remote services 328.

The communications connection(s) 306 can include physical and/or logical interfaces for connecting the vehicle computing device 302 to another computing device or a network, such as network(s) 330. For example, the communications connection(s) 306 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 can include one or more drive modules 310. In some instances, the vehicle 102 can have a single drive module 310. In at least one example, if the vehicle 102 has multiple drive modules 310, individual drive modules 310 can be positioned on opposite ends of the vehicle 102 (e.g., the front and the rear, etc.). In at least one example, the drive module(s) 310 can include one or more sensor systems to detect conditions of the drive module(s) 310 and/or the surroundings of the vehicle 102. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect entities in the surroundings of the drive module, lidar sensors, radar sensors, etc. Some sensors, such as the wheel encoders can be unique to the drive module(s) 310. In some cases, the sensor system(s) 110 on the drive module(s) 310 can overlap or supplement corresponding systems of the vehicle 102 (e.g., sensor system(s) 110).

The drive module(s) 310 can include many of the vehicle systems, including a high voltage battery, a motor to propel the vehicle 102, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 310 can include a drive module controller which can receive and preprocess the sensor data 104 from the sensor system(s) 110 and to control operation of the various vehicle systems. In some instances, the drive module controller can include one or more processors and memory communicatively coupled with the one or more processors. The memory can store one or more modules to perform various functionalities of the drive module(s) 310. Furthermore, the drive module(s) 310 also include one or more communication connection(s) that enable communication by the respective drive module with one or more other local or remote computing device(s).

In at least one example, the direct connection 308 can provide a physical interface to couple the one or more drive module(s) 310 with the body of the vehicle 102. For example, the direct connection 308 can allow the transfer of energy, fluids, air, data, etc. between the drive module(s) 310 and the vehicle 102. In some instances, the direct connection 308 can further releasably secure the drive module(s) 310 to the body of the vehicle 102.

In at least one example, the localization component 314, perception component 316, the planning component 318, the event detection component 324, and/or the flagging component 326 can process the sensor data 104, as described above, and can send their respective outputs, over the one or more network(s) 330, to one or more computing device(s) 328. In at least one example, the localization component 314, the perception component 316, the planning component 318, the event detection component 324, and/or the flagging component 326 can send their respective outputs to the one or more computing device(s) 328 at a particular frequency, after a lapse of a predetermined period of time, upon occurrence of one or more conditions, in near real-time, etc.

The processor(s) 312 of the vehicle 102 and/or the processor(s) 330 of the computing device(s) 328 can be any suitable processor capable of executing instructions to process data and perform operations as described herein. By way of example and not limitation, the processor(s) 312 and 330 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

Memory 112 and memory 332 are examples of non-transitory computer-readable media. The memory 112 and memory 332 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 102 can be associated with the computing device(s) 328 and/or components of the computing device(s) 328 can be associated with the vehicle 102. That is, the vehicle 102 can perform one or more of the functions associated with the computing device(s) 328, and vice versa.

Figure 4:
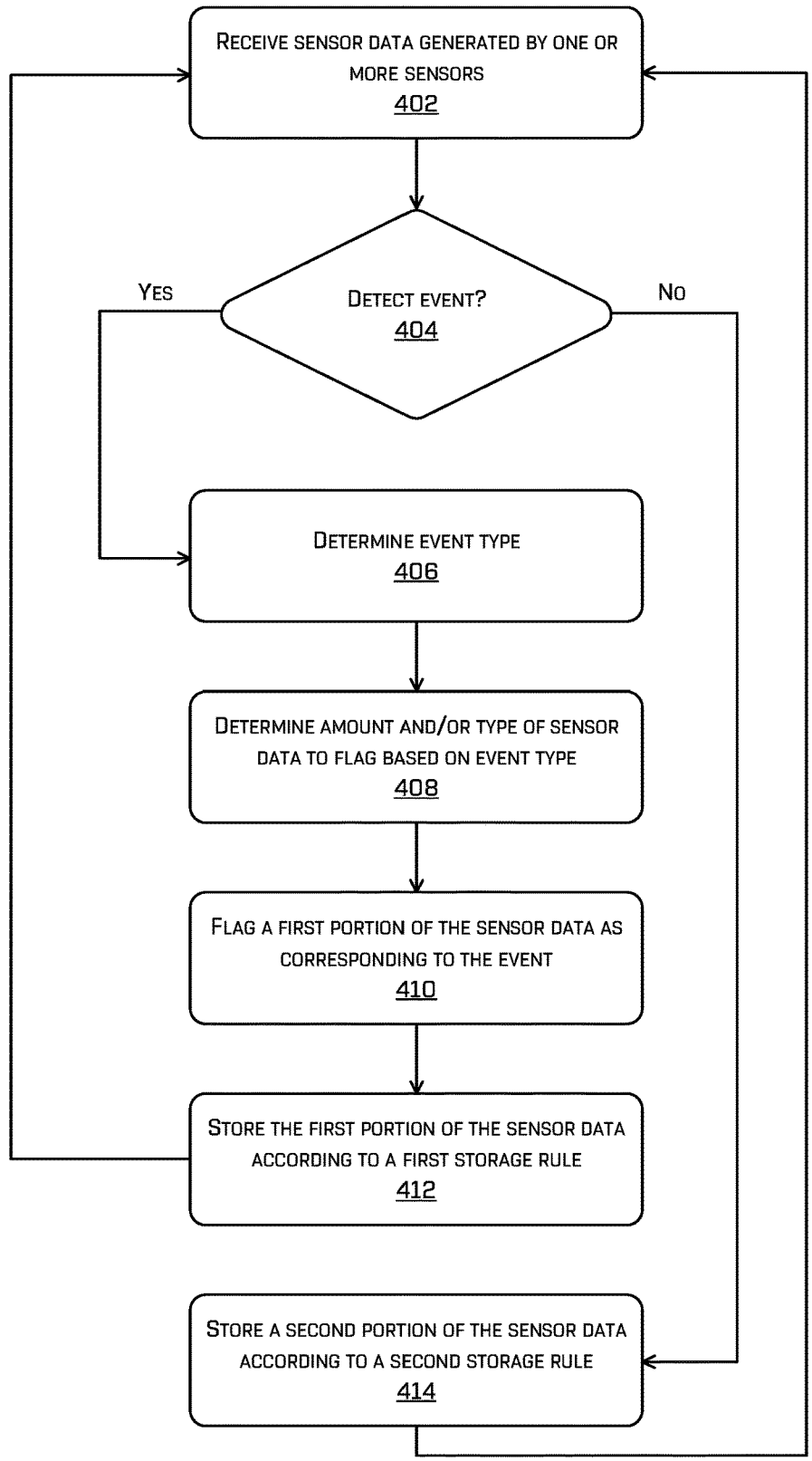
FIG. 4 depicts an example process for storing data in a memory according to storage rules, according to embodiments of the disclosure.
Figure 5:
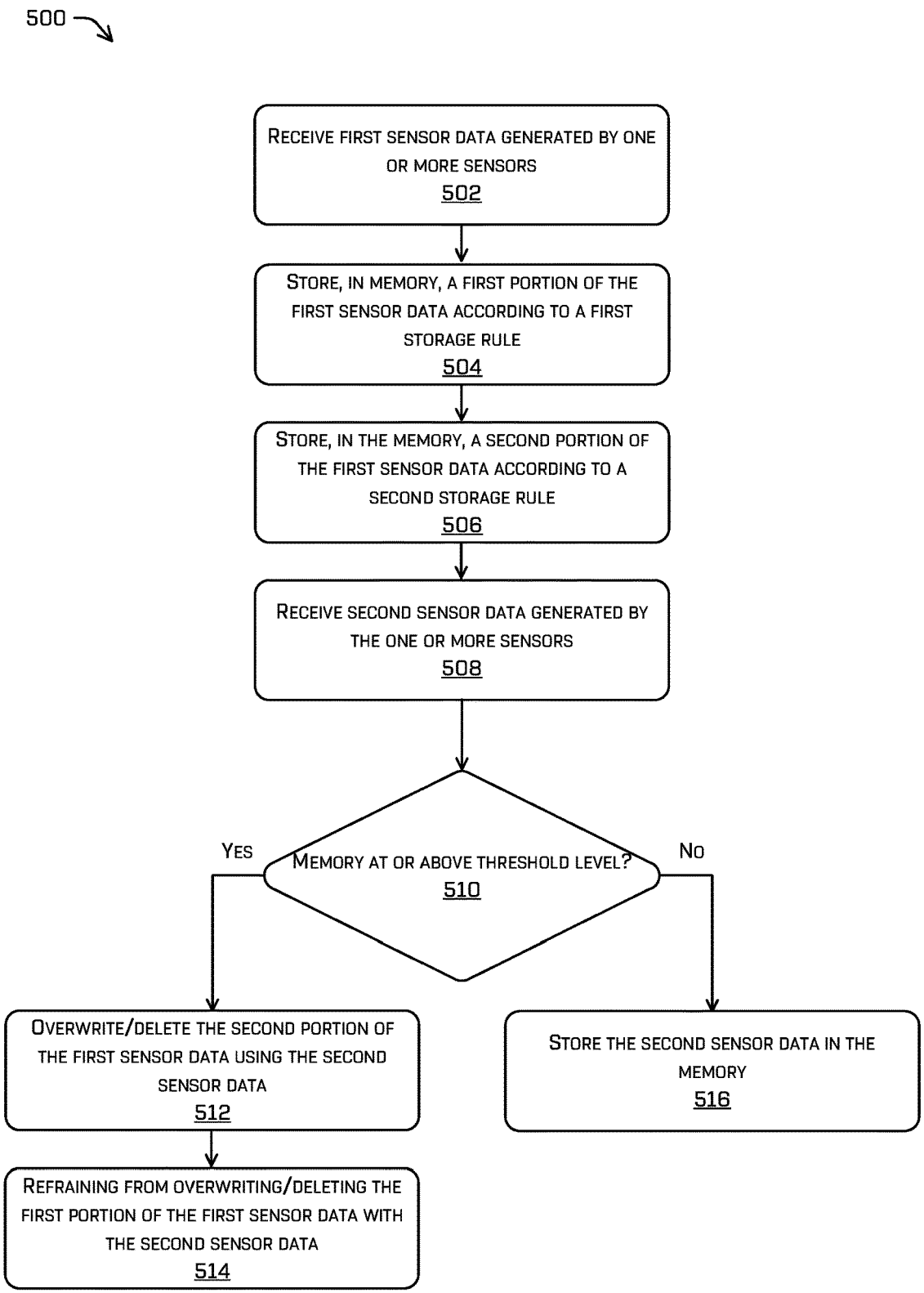
FIG. 5 depicts an example process for overwriting data stored in a memory according to storage rules, according to embodiments of the disclosure.
Figure 6:
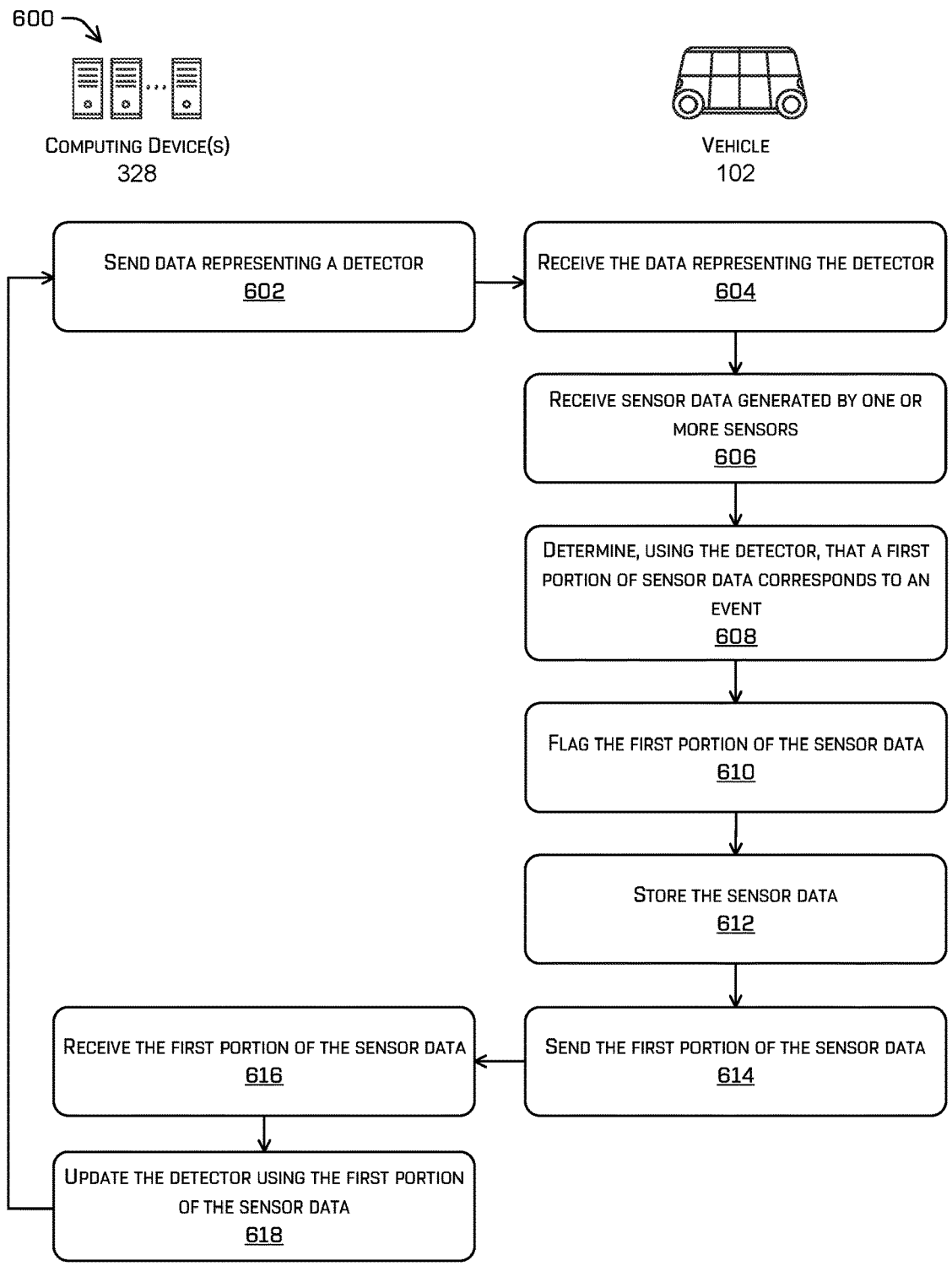
FIG. 6 depicts an example process for updating a detector using data generated by a vehicle, according to embodiments of the present disclosure.

FIGS. 4-6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 depicts an example process 400 for storing data in a memory according to storage rules, according to embodiments of the disclosure. At operation 402, the process 400 can include receiving sensor data generated by one or more sensors. For example, the vehicle 102 can receive the sensor data generated by the one or more sensors. As discussed above, the sensors system(s) 110 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc.

At 404, the process 400 can include detecting whether an event occurs. For example, the vehicle 102 can analyze the sensor data in order to determine if the sensor data represents the event. As discussed above, the event may include, but is not limited to, an inconsistency between outputs of detector(s) that analyze sensor data (from different sensor modalities or different sensors of the same modality), a maneuver of the vehicle (e.g., hard stop, swerve, no-go decision, etc.), detection of an object or object type (e.g., emergency vehicle, pedestrian, bicycle, pickup truck, etc.) located within the environment, a teleoperator intervention (e.g., a teleoperator communicating with and/or providing information to the vehicle), a user call to a teleoperator, a lack of convergence of planner, a deviation in predicted behavior of an object in the environment, a confidence level associated with a system of the vehicle being below a threshold, unique sensor data, infrequently occurring sensor data, unusual sensor data, a vehicle diagnosis error/warning/failure, a specific sound (e.g., sound above a decibel level, a specific word detected, a siren, etc.) within the environment, an input corresponding to an emergency, etc.

If at 404, the process 400 determines that the event is occurring, then at 406, the process 400 can include determining an event type. For example, based at least in part on the vehicle 102 detecting the event, the vehicle 102 can determine the event type associated with the event. For instance, if the event includes a specific object located in the environment, then the vehicle 102 may determine that the event type includes a specific type of object.

At 408, the process 400 can include determining an amount and/or type of sensor data based at least in part on the event type. For example, the vehicle 102 can determine the amount and/or type of sensor data based at least in part on the event type. In some instances, the vehicle 102 first determines the sensor data corresponding to the event (e.g., the sensor data generated by the one or more sensors during the event). The vehicle 102 can then determine a first amount of data that was generated by the one or more sensors during a first period of time that occurred prior to the event and/or a second amount of data that was generated by the one or more sensors during a second period of time that occurred subsequent to the event. In some instances, the first amount of data may be the same as or similar to the second amount of data. In other instances, the first amount of data may be different than the second amount of data.

Additionally or alternatively, in some instances, the vehicle 102 can determine the type of sensor data to flag based at least in part on the event type. For a first example, the vehicle 102 can determine to store substantially all of the sensor data (e.g., all types of the sensor data) based at least in part on the event type. For a second example, the vehicle 102 can determine, based at least in part on the event type, to store a first type of sensor data (e.g., image data generated by camera(s)), while determining not to store a second type of sensor data (e.g., lidar data generated by lidar sensor(s)) associated with the event.

At 410, the process 400 can include flagging a first portion of the sensor data as corresponding to the event. For example, the vehicle 102 can flag the first portion of the sensor data, where the first portion of the sensor data includes the determined amount and/or type of sensor data.

At 412, the process 400 can include storing the first portion of the sensor data according to a first storage rule. For example, the vehicle 102 can store, in memory, the first portion of the sensor data according to the first storage rule. In some instances, the first storage rule may indicate that the first portion of the sensor data is to be preserved (e.g., not to be deleted or overwritten by additional sensor data), the first portion of the sensor data is to be stored for a first period of time, the first portion of the sensor data is to be stored in raw/uncompressed form, the first portion of the sensor data is to be stored at a first resolution, the first portion of the sensor data is to be sent to one or more computing devices before other sensor data, and/or so forth. The process 400 may then repeat back at 402 to perform event-based data logging on additional sensor data.

However, if at 404, the process 400 determines that the event is not occurring, then at 414, the process 400 can include storing a second portion of the sensor data according to a second storage rule. In some instances, the second storage rule may indicate that the second portion of the sensor data is to be overwritten by additional sensor data, the second portion of the sensor data is to be stored for a second period of time, the second portion of the sensor data is to be stored in compressed form, the second portion of the sensor data is to be stored at a second resolution different than the first resolution (e.g., lower), the second portion of the sensor data is to be sent to one or more computing devices after sensor data stored according to the first storage rule, the second portion of the sensor data is not to be sent to the one or more computing devices, and/or so forth. The process 400 may then repeat back at 402 to perform event-based data logging on additional sensor data.

FIG. 5 depicts an example process 500 for overwriting data stored in a memory according to storage rules, according to embodiments of the disclosure. At 502, the process 500 can include receiving first sensor data generated by one or more sensors. For example, the vehicle 102 can receive the first sensor data generated by the one or more sensors.

At 504, the process 500 can include storing, in memory, a first portion of the first sensor data according to a first storage rule. For example, the vehicle 102 can store, in the memory, the first portion of the first sensor data according to the first storage rule. The first portion of the first sensor data can include sensor data that corresponds to (e.g., represents) an event, sensor data that was generated a first amount of time prior to the event, and/or sensor data that was generated a second amount of time subsequent to the event. In some instances, the first storage rule indicates that the first portion of the first sensor data is not to be overwritten/deleted by additional sensor data.

At 506, the process 500 can include storing, in the memory, a second portion of the first sensor data according to a second storage rule. For example, the vehicle 102 can store, in the memory, the second portion of the first sensor data according to the second storage rule. The second portion of the first sensor data can include sensor data other than the first portion of the first sensor data. In some instances, the second storage rule can indicate that the second portion of the first sensor data may be overwritten/deleted by additional sensor data.

At 508, the process 500 can include receiving second sensor data generated by the one or more sensors. For example, the vehicle 102 can receive the second sensor data generated by the one or more sensors.

At 510, the process 500 can include determining whether the memory is at or above a threshold level (e.g., full, 95% of capacity, 90% of capacity, 75% of capacity, etc.).

If at 510, the process 500 determines that the memory is at or above the threshold level, then at 512, the process 500 can include overwriting/deleting the second portion of the first sensor data using the second sensor data. For example, if the vehicle 102 determines that the memory is at or above the threshold level, then the vehicle 102 can overwrite/delete the second portion of the first sensor data with the second sensor data. The vehicle 102 can overwrite/delete the second portion of the first sensor data based at least in part on the second portion of the first sensor data being stored according to the second storage rule.

At 514, the process 500 can include refraining from overwriting/deleting the first portion of the first sensor data with the second sensor data. For example, the vehicle 102 can refrain from overwriting/deleting the first portion of the first sensor data with the second sensor data. The vehicle 102 can refrain from overwriting/deleting the first portion of the first sensor data based at least in part on the first portion of the first sensor data being stored in accordance with the first storage rule.

However, if at 510, the process 500 determines that the memory is not at or above the threshold level, then at 516, the process 500 can include storing the second sensor data in the memory. For example, if the vehicle 102 determines that the memory is not full, then the vehicle 102 may store the second sensor data in the memory.

FIG. 6 depicts an example process 600 for updating a detector using sensor data generated by a vehicle, according to embodiments of the present disclosure. In some instances, the processes on the left side of FIG. 6 can be performed by the computing device(s) 328 and the processes on the right side of FIG. 6 can be performed by the vehicle 102. However, the process 600 is not limited to being performed by the computing device(s) 328 and/or the vehicle 102.

At 602, the process 600 can include sending data representing a detector. For example, the computing device(s) 328 can send the data representing the detector to the vehicle 102. In some instances, the detector may be utilized by the vehicle 102 to detect an object and/or an object type. For instance, the vehicle 102 can analyze sensor data 104 using the detector and, based at least in part on the analysis, detect that the sensor data 104 represents the object and/or the object type.

At 604, the process 600 can include receiving the data representing the detector. For example, the vehicle 102 can receive the data representing the detector from the computing device(s) 328. The vehicle 102 may then store the data representing the detector in memory.

At 606, the process 600 can include receiving sensor data generated by one or more sensors. For example, the vehicle 102 can receive the sensor data generated by the one or more sensors. In some instances, the vehicle 102 receives the sensor data while navigating within an environment.

At 608, the process 600 can include determining, using the detector, that a first portion of the sensor data corresponds to an event. For example, the vehicle 102 can analyze the sensor data using the detector. Based at least in part on the analysis, the vehicle 102 can determine that an output from the detector indicates that the event is occurring or already occurred. As such, the vehicle 102 can determine that the first portion of the sensor data represents the event. For instance, in some examples it may be desirable to log sensor data depicting certain objects or types of objects (e.g., rare or uncommon objects, unique objects, etc.). By way of example and not limitation, the logged sensor data may be tagged (manually and/or automatically) and used as training data to train a detector to better detect or classify such objects, to investigate a crime involving such objects (e.g., a stolen car, a car involved in a hit and run, etc.), or for other purposes. In an example in which sensor data depicting a particular type of object (e.g., a recumbent bicycle) constitutes an event, if the detector detects an instance of the particular type of object (e.g., the recumbent bicycle), the vehicle 102 can analyze the sensor data using the detector. The output from the detector may indicate that the particular type of object (e.g., the recumbent bicycle) has been detected. As such, the vehicle 102 can determine that the event has occurred and can log sensor data associated with the event.

At 610, the process 600 can include flagging the first portion of the sensor data. For example, the vehicle 102 can flag the first portion of the sensor data based at least in part on the first portion of the sensor data representing the event.

At 612, the process 600 can include storing the sensor data. For example, the vehicle 102 can store the sensor data in memory. In some instances, based at least in part on the first portion of the sensor data being flagged, the vehicle 102 can store the first portion of the sensor data according to a first storage rule. Additionally, the vehicle 102 can store a second portion of the sensor data according to a second, different storage rule.

At 614, the process 600 can include sending the first portion of the sensor data. For example, the vehicle 102 can send the first portion of the sensor data to the computing device(s) 328. In some instances, the vehicle 102 sends the first portion of the sensor data based at least in part on the first portion of the sensor data being stored according to the first storage rule. In some instances, the vehicle 102 refrains from sending the second portion of the sensor data based at least in part on the second portion of the sensor data being stored according to the second storage rule.

At 616, the process 600 can include receiving the first portion of the sensor data. For example, the computing device(s) 328 can receive the first portion of the sensor data from the vehicle 102.

At 618, the process 600 can include updating the detector using the first portion of the sensor data. For example, the computing device(s) 328 can update the detector by training the detector using the first portion of the sensor data. For instance, if the detector is used to detect a specific object, and the first portion of the sensor data represents the specific object, then the first portion of the sensor data can be manually and/or automatically tagged as including the specific object and used as training data to train the detector. In some examples, the training may be offline training performed at the computing device(s) 328. Additionally or alternatively, training may be performed online while the detectors are running on the vehicle 102. In some instances, the process can repeat starting back at 602. For example, the computing device(s) 328 may send data representing the updated detector to the vehicle for use in detecting objects and/or object types. The computing device(s) 328 may then continue to receive sensor data from the vehicle 102 and use the sensor data to update the detector. In this way, event-based data logging may be used to improve performance of vehicle computing devices by updating detectors used by vehicles to detect objects and/or object types during operation.

Example Clauses

A: An autonomous vehicle comprising: one or more sensors to capture data of an environment of the autonomous vehicle; one or more processors; and memory storing instructions that, when executed by the one or more processors, configure the autonomous vehicle to perform operations comprising: receiving sensor data generated by the one or more sensors; detecting, based at least in part on the sensor data, an event comprising at least one of: an inconsistency in detecting an object associated with sensor data of a first sensor of the one or more sensors and sensor data of a second sensor of the one or more sensors; a maneuver of the autonomous vehicle; or an object type located within the environment; based at least in part on detecting the event, flagging a first portion of the sensor data generated by the one or more sensors as corresponding to the event; storing the first portion of the sensor data in the memory for a first period of time; and storing a second portion of the sensor data generated by the one or more sensors, different than the first portion of the sensor data, in the memory for a second period of time different than the first period of time.

B: The autonomous vehicle as paragraph A describes, the operations further comprising: determining an event type associated with the event; and determining, based at least in part on the event type, an amount of the first portion of the sensor data to flag as corresponding to the event.

C: The autonomous vehicle as either paragraphs A or B describe, wherein the one or more sensors capture multiple types of sensor data, and the operations further comprise: determining a type of data from among the multiple types of data to flag based at least in part on the event, wherein the first portion of the sensor data includes the type of data.

D: The autonomous vehicle as paragraph C describes, wherein: the multiple types of sensor data comprise at least two of lidar data, image data, radar data, sonar data, location data, time of flight data, or vehicle diagnostic data, and the type of data to flag comprises at least one, and less than all, of the multiple types of sensor data captured by the one or more sensors.

E: The autonomous vehicle as any of paragraphs A-D describe, wherein detecting the event comprises detecting the inconsistency in the detecting of the object associated with the sensor data of the first sensor and the second data of the second sensor based at least in part on: indicating presence of the object based at least in part on the sensor data of first sensor; and indicating absence of the object, based at least in part on the sensor data of the second sensor.

F: The autonomous vehicle as any of paragraphs A-E describe, wherein detecting the event comprises detecting the maneuver of the autonomous vehicle, the maneuver comprising at least one of: an acceleration of the autonomous vehicle exceeding an acceleration threshold; or a deceleration of the autonomous vehicle exceeding a deceleration threshold.

G: A computer-readable medium having thereon computer-executable instructions that, responsive to execution, configure a computer to perform a system as any of paragraphs A-F describe.

H: A method comprising: receiving sensor data generated by one or more sensors; detecting, based at least in part on the sensor data, an event comprising at least one of: an inconsistency in detecting an object associated with sensor data of a first sensor of the one or more sensors and sensor data of a second sensor of the one or more sensors; a maneuver of an autonomous vehicle; or a specified object type located within the environment; based at least in part on detecting the event, flagging a first portion of the sensor data; storing the first portion of the sensor data generated by the one or more sensors in memory according to a first storage rule; and storing a second portion of the sensor data generated by the one or more sensors, different than the first portion of the sensor data, in the memory according to a second storage rule different than the first storage rule.

I: The method as paragraph H describes, further comprising: receiving additional sensor data generated by the one or more sensors; based at least in part on the first storage rule, maintaining the first portion of the sensor data in the memory; and based at least in part on the second storage rule, overwriting at least a portion of the second portion of the sensor data with the additional sensor data.

J: The method as either paragraphs H or I describe, wherein: storing the first portion of the sensor data according to the first storage rule comprises storing the first portion of the sensor data for a first period of time; and storing the second portion of the sensor data according to the second storage rule comprises storing the second portion of the sensor data for a second period of time, the second period of time being different than the first period of time.

K: The method as any of paragraphs H-J describe, further comprising: determining, based at least in part on the event, an amount of the first portion of the sensor data to flag as corresponding to the event.

L: The method as paragraph K describes, wherein: a first amount of the first portion of the sensor data being generated prior to the event; and a second amount of the first portion of the sensor data, different than the first amount, being generated subsequent to the event.

M: The method as any of paragraphs H-L describe, wherein the one or more sensors capture multiple types of sensor data, and the method further comprises: determining an event type associated with the event; and determining a type of data from among the multiple types of data to flag based at least in part on the event type, wherein the first portion of the sensor data includes the type of data.

N: The method as paragraph M describes, wherein: the event type comprises at least one of: a first event type associated with the inconsistency in detecting the object; a second event type associated with the maneuver of the autonomous vehicle; or a third event type associated with the specified object type located within the environment; and the type of data to flag comprises at least one of lidar data, image data, radar data, sonar data, location data, time of flight data, wheel encoder data, inertial measurement unit data, or vehicle diagnostic data.

O: The method as any of paragraphs H-N describe, wherein detecting the event comprises detecting the inconsistency in the detecting of the object associated with the sensor data of the first sensor and the sensor data of the second sensor based at least in part on: indicating presence of the object based at least in part on the sensor data of the first sensor; and indicating absence of the object based at least in part on the sensor data of the second sensor.

P: The method as any of paragraphs H-O describe, wherein detecting the event comprises detecting the maneuver of the autonomous vehicle, the maneuver comprising at least one of: an acceleration of the autonomous vehicle exceeding an acceleration threshold; or a deceleration of the autonomous vehicle exceeding a deceleration threshold.

Q: The method as any of paragraphs H-P describe, wherein detecting the event comprises detecting the object type located within the environment by: determining, based at least in part on a detector, that the sensor data includes data representing an object of the type of object.

R: The method as any of paragraphs H-Q describe, further comprising sending, to one or more computing devices, the first portion of the sensor data based least in part on flagging the first portion of the sensor data.

S: The method as any of paragraphs H-R describe, further comprising: storing one or more algorithms associated with detecting the event, wherein detecting the event comprises: inputting the sensor data generated by the one or more sensors to the one or more algorithms; and determining that an output from the one or more algorithms indicates the event.

T: A system or device comprising: a means for processing; and a means for storing coupled to the means for processing, the means for storing including instructions to configure one or more devices to perform a computer-implemented method as any of paragraphs H-S describe.

U: A computer-readable medium having thereon computer-executable instructions that, responsive to execution, configure a computer to perform a method as any one of paragraphs H-S describe.

V: One or more computer-readable media storing instructions that, when executed by one or more processors, cause the one or more processors to perform operations comprising: receiving sensor data generated by one or more sensors; detecting, based at least in part on the sensor data, an event comprising at least one of: an inconsistency associated with detecting an object associated with sensor data of a first sensor and sensor data of a second sensor of the one or more sensors; a maneuver of an autonomous vehicle; or a specified object type located within the environment; and based at least in part on detecting the event, flagging a first portion of the sensor data; storing the first portion of the sensor data generated by the one or more sensors in memory according to a first storage rule; and storing a second portion of the sensor data generated by the one or more sensors, different than the first portion of the sensor data, in the memory according to a second storage rule different than the first storage rule.

W: The one or more computer-readable media as paragraph V describes, the operations further comprising: receiving additional sensor data generated by the one or more sensors; based at least in part on the first storage rule, maintaining the first portion of the sensor data in the memory; and based at least in part on the second storage rule, overwriting at least a portion of the second portion of the sensor data with the additional sensor data.

X: A system or device comprising: a processor; and the non-transitory computer-readable medium as either paragraphs V or W describe coupled to the processor.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
   one or more sensors to capture data of an environment of the autonomous vehicle;
   one or more processors; and
   memory storing instructions that, when executed by the one or more processors, configure the autonomous vehicle to perform operations comprising:
      receiving sensor data generated by the one or more sensors;
      detecting, based at least in part on the sensor data, an event indicative of a confidence level associated with a system of the autonomous vehicle being below a threshold;
      flagging, based at least in part on detecting the event, a first portion of the sensor data corresponding to at least one of a first period of time prior to the event, a second period of time during to the event, or a third period of time subsequent to the event;
      storing the first portion of the sensor data in the memory for a fourth period of time occurring after the third period of time; and
      storing a second portion of the sensor data, different than the first portion of the sensor data, in the memory for a fifth period of time different than the fourth period of time.

2. The autonomous vehicle as recited in claim 1, the operations further comprising:
   determining, based at least in part on the sensor data, a classification of at least one of:
      an object in the environment of the autonomous vehicle; or
      a maneuver of the autonomous vehicle; and
   determining, based at least in part on the classification, the fourth period of time, the fifth period of time, and an amount of the first portion of the sensor data to flag as corresponding to the event.

3. The autonomous vehicle as recited in claim 1, wherein the one or more sensors capture multiple types of sensor data, and the operations further comprise:
  determining a type of data from among the multiple types of sensor data to flag based at least in part on the system,
  wherein the first portion of the sensor data includes the type of data.

4. The autonomous vehicle as recited in claim 3, wherein:
  the multiple types of sensor data comprise at least two of lidar data, image data, radar data, sonar data, location data, time of flight data, or vehicle diagnostic data, and
  the type of data to flag comprises at least one, and less than all, of the multiple types of sensor data captured by the one or more sensors.

5. The autonomous vehicle as recited in claim 1, wherein the confidence level is based at least in part on determining an inconsistency in detecting of an object based at least in part on:
  detecting presence of the object based at least in part on first sensor data of a first sensor; and
  detecting absence of the object, based at least in part on second sensor data of a second sensor.

6. The autonomous vehicle as recited in claim 2, wherein the classification of the maneuver of the autonomous vehicle comprises at least one of:
  an acceleration of the autonomous vehicle exceeding an acceleration threshold; or
  a deceleration of the autonomous vehicle exceeding a deceleration threshold.

7. The autonomous vehicle as recited in claim 1, wherein the operations further comprise:
  training, based at least in part on the flagged sensor data, a prediction component of the autonomous vehicle,
  wherein the flagged sensor data is used as training data.

8. The autonomous vehicle as recited in claim 1, wherein the system is a trajectory generation system, and the confidence level is indicative of a likelihood that a generated trajectory will navigate the autonomous vehicle successfully from a first location to a second location.

9. The autonomous vehicle as recited in claim 1, wherein the confidence level is based at least in part on comparing a predicted trajectory of a detected object to a measured trajectory of the detected object.

10. A method comprising:
  receiving sensor data generated by multiple modalities of sensors, wherein the multiple modalities of sensors capture multiple types of sensor data;
  detecting, based at least in part on the sensor data, an event indicative of a confidence level associated with a system of an autonomous vehicle being below a threshold;
  determining a first type of sensor data generated by a first sensor modality to flag, based at least in part on detecting the event;
  flagging a first portion of the sensor data of the first type;
  storing the first portion of the sensor data in memory according to a first storage rule; and
  storing a second portion of the sensor data of a second type generated by a second sensor modality, different than the first sensor modality, in the memory according to a second storage rule different than the first storage rule.

11. The method as recited in claim 10, further comprising:
  receiving additional sensor data generated by the multiple modalities of sensors;
  based at least in part on the first storage rule, maintaining the first portion of the sensor data in the memory; and
  based at least in part on the second storage rule, overwriting at least a portion of the second portion of the sensor data with the additional sensor data.

12. The method as recited in claim 10, wherein:
  storing the first portion of the sensor data according to the first storage rule comprises storing the first portion of the sensor data for a first period of time; and
  storing the second portion of the sensor data according to the second storage rule comprises storing the second portion of the sensor data for a second period of time, the second period of time being less than the first period of time.

13. The method as recited in claim 10, further comprising:
  determining, based at least in part on the sensor data, a type associated with at least one of:
    a maneuver of the autonomous vehicle; or
    an object located within an environment of operation of the autonomous vehicle; and
  the first type of sensor data to flag comprises at least one of lidar data, image data, radar data, sonar data, location data, time of flight data, wheel encoder data, inertial measurement unit data, or vehicle diagnostic data.

14. The method as recited in claim 10, wherein the confidence level is based at least in part on determining an inconsistency in detecting an object based at least in part on:
  detecting presence of the object based at least in part on sensor data of a first sensor; and
  detecting absence of the object based at least in part on sensor data of a second sensor.

15. The method as recited in claim 10, further comprising sending, to one or more computing devices, the first portion of the sensor data based least in part on flagging the first portion of the sensor data.

16. The method as recited in claim 10, further comprising:
  storing one or more algorithms associated with detecting the event,
  wherein detecting the event comprises:
    inputting the sensor data generated by the multiple modalities of sensors to the one or more algorithms; and
    determining that an output from the one or more algorithms indicates the event.

17. The method of claim 10, wherein:
  the multiple modalities of sensors comprise at least two of lidar, image, radar, sonar, location, time of flight, or vehicle diagnostics, and
  the first type of sensor data to flag comprises at least one, and less than all, of the multiple types of sensor data generated by the multiple modalities of sensors.

18. One or more computer-readable media storing instructions that, when executed by one or more processors, cause the one or more processors to perform operations comprising:
  receiving sensor data generated by one or more sensors;
  detecting, based at least in part on the sensor data, an event indicative of a confidence level associated with a system of an autonomous vehicle being below a threshold; and
  based at least in part on detecting the event, flagging a first portion of the sensor data associated with at least one of a first period of time before the event, a second period of time during the event, or a third period of time subsequent to the event;

storing the first portion of the sensor data generated by the one or more sensors in memory according to a first storage rule, wherein the first storage rule comprises at least a duration of storage after the third period of time; and storing a second portion of the sensor data generated by the one or more sensors, different than the first portion of the sensor data, in the memory according to a second storage rule different than the first storage rule.

19. The one or more computer-readable media as recited in claim 18, the operations further comprising:

receiving additional sensor data generated by the one or more sensors;

based at least in part on the first storage rule, maintaining the first portion of the sensor data in the memory; and based at least in part on the second storage rule, overwriting at least a portion of the second portion of the sensor data with the additional sensor data.

20. The one or more computer-readable media as recited in claim 18, wherein the confidence level is associated with at least one of: an object detection system, an object classification system, or a trajectory generation system.

\* \* \* \* \*